(12) United States Patent
Li et al.

(10) Patent No.: US 12,141,374 B2
(45) Date of Patent: Nov. 12, 2024

(54) METHOD APPLIED TO SIGNAL SYNCHRONIZATION SYSTEM, SYSTEM, STYLUS, AND ELECTRONIC DEVICE

(71) Applicant: Honor Device Co., Ltd., Shenzhen (CN)

(72) Inventors: Hang Li, Shenzhen (CN); Yi Su, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/262,879

(22) PCT Filed: Jan. 14, 2022

(86) PCT No.: PCT/CN2022/072154
§ 371 (c)(1),
(2) Date: Jul. 25, 2023

(87) PCT Pub. No.: WO2022/193815
PCT Pub. Date: Sep. 22, 2022

(65) Prior Publication Data
US 2024/0094841 A1    Mar. 21, 2024

(30) Foreign Application Priority Data

Mar. 15, 2021   (CN) .......................... 202110293428.X
Apr. 2, 2021   (CN) .......................... 202110363220.0

(51) Int. Cl.
*G06F 3/0354*   (2013.01)
*G06F 1/16*   (2006.01)
(Continued)

(52) U.S. Cl.
CPC ........ *G06F 3/03545* (2013.01); *G06F 1/1607* (2013.01); *G06F 1/1698* (2013.01);
(Continued)

(58) Field of Classification Search
CPC .................................................. G06F 3/04162
See application file for complete search history.

(56) References Cited

U.S. PATENT DOCUMENTS 9,946,366 B2   4/2018   Shahparnia et al.
10,488,982 B2   11/2019   Gur et al.
(Continued)

FOREIGN PATENT DOCUMENTS

CN   105247459 A   1/2016
CN   107003755 A   8/2017
(Continued)

*Primary Examiner* — Chun-Nan Lin
(74) *Attorney, Agent, or Firm* — Conley Rose, P.C.

(57) ABSTRACT

A method applied to a signal synchronization system, a system, a stylus, and an electronic device. The system includes a stylus and an electronic device. The electronic device supports a first refresh rate and a second refresh rate. The method includes: after an electronic device is wirelessly connected to a stylus, the electronic device samples a downlink signal from the stylus based on a third refresh rate, where the third refresh rate is equal to a first refresh rate or a second refresh rate; and the stylus sends the downlink signal to the electronic device based on the third refresh rate, and samples an uplink signal from the electronic device at a fourth refresh rate, where the fourth refresh rate is the least common multiple of the first refresh rate and the second refresh rate.

19 Claims, 23 Drawing Sheets

(51) Int. Cl.
*G06F 1/26* (2006.01)
*G06F 3/02* (2006.01)
*G06F 3/023* (2006.01)
*G06F 3/038* (2013.01)
*G06F 3/041* (2006.01)
*G06F 3/044* (2006.01)
*G06F 3/04842* (2022.01)
*G06F 3/04883* (2022.01)
*G06F 40/166* (2020.01)
*H02J 7/34* (2006.01)
*H02J 50/10* (2016.01)
*H02J 50/80* (2016.01)
*H04W 72/21* (2023.01)
*H04W 72/23* (2023.01)

(52) U.S. Cl.
CPC .............. *G06F 1/266* (2013.01); *G06F 3/021* (2013.01); *G06F 3/0231* (2013.01); *G06F 3/038* (2013.01); *G06F 3/0383* (2013.01); *G06F 3/0412* (2013.01); *G06F 3/04162* (2019.05); *G06F 3/0441* (2019.05); *G06F 3/0442* (2019.05); *G06F 3/04842* (2013.01); *G06F 3/04883* (2013.01); *G06F 40/166* (2020.01); *H02J 7/342* (2020.01); *H02J 50/10* (2016.02); *H02J 50/80* (2016.02); *H04W 72/21* (2023.01); *H04W 72/23* (2023.01); *G06F 3/0202* (2013.01); *G06F 2200/1632* (2013.01); *G06F 2203/0384* (2013.01)

(56) References Cited

U.S. PATENT DOCUMENTS

| | | | |
|---|---|---|---|
| 10,739,909 | B1 | 8/2020 | Lin et al. |
| 11,392,226 | B2 | 7/2022 | Zou et al. |
| 11,556,204 | B2 | 1/2023 | Koike et al. |
| 2013/0169601 | A1 | 7/2013 | Mo et al. |
| 2014/0354555 | A1* | 12/2014 | Shahparnia ......... G06F 3/04162 345/173 |
| 2016/0092010 | A1* | 3/2016 | Agarwal ............... G06F 3/0412 345/173 |
| 2018/0024654 | A1* | 1/2018 | Koike ................... G06F 3/0441 345/174 |
| 2019/0278388 | A1 | 9/2019 | Barel et al. |
| 2020/0192496 | A1 | 6/2020 | Yamamoto |
| 2021/0018992 | A1 | 1/2021 | Karsuntsev et al. |
| 2022/0019331 | A1* | 1/2022 | Park ..................... G06F 3/04184 |

FOREIGN PATENT DOCUMENTS

| | | |
|---|---|---|
| CN | 107135179 A | 9/2017 |
| CN | 110007784 A | 7/2019 |
| CN | 110471546 A | 11/2019 |
| CN | 111105766 A | 5/2020 |
| CN | 111899680 A | 11/2020 |
| EP | 3282346 A1 | 2/2018 |

* cited by examiner

METHOD APPLIED TO SIGNAL SYNCHRONIZATION SYSTEM, SYSTEM, STYLUS, AND ELECTRONIC DEVICE

CROSS-REFERENCE TO RELATED APPLICATIONS

This application is a U.S. National Stage of International Application No. PCT/CN2022/072154 filed on Jan. 14, 2022, which claims priority to Chinese Patent Application No. 202110293428.X, filed with the China National Intellectual Property Administration on Mar. 15, 2021, and to Chinese Patent Application No. 202110363220.0, filed with the China National Intellectual Property Administration on Apr. 2, 2021, all of which are incorporated herein by reference in their entireties.

TECHNICAL FIELD

Embodiments of this application relate to terminal technologies, and in particular, to a method applied to a signal synchronization system, a system, a stylus, and an electronic device.

BACKGROUND

With development of touch technologies, more electronic devices perform human-computer interaction in a touch manner. A user may provide an input to an electronic device by operating a touch screen of the electronic device by using a stylus, and the electronic device performs a corresponding operation based on the input.

Currently, after the electronic device is wirelessly connected to the stylus, to ensure signal synchronization between the electronic device and the stylus, the stylus may send a downlink signal to the electronic device based on a refresh rate of the electronic device. However, when the electronic device is in use, the refresh rate may be switched based on different application scenarios, and if the stylus cannot detect switching of the refresh rate of the electronic device in a timely manner, the stylus cannot keep signal synchronization with the electronic device, and consequently, the electronic device and the stylus cannot interact.

SUMMARY

Embodiments of this application provide a method applied to a signal synchronization system, a system, a stylus, and an electronic device, where the stylus can detect switching of a refresh rate of the electronic device in a timely manner.

According to a first aspect, an embodiment of this application provides a method applied to a signal synchronization system, where the system includes a stylus and an electronic device, and the electronic device supports a first refresh rate and a second refresh rate. The method includes: after the electronic device is wirelessly connected to the stylus, the electronic device samples a downlink signal from the stylus based on a third refresh rate, where the third refresh rate is equal to the first refresh rate or the second refresh rate; and the stylus sends the downlink signal to the electronic device based on the third refresh rate, and samples an uplink signal from the electronic device at a fourth refresh rate, where the fourth refresh rate is the least common multiple of the first refresh rate and the second refresh rate. In an embodiment, the first refresh rate is 60 Hz, and the second refresh rate is 90 Hz.

The wireless connection may be, but is not limited to, a Bluetooth connection, a Wi-Fi hotspot, or the like. After the electronic device is wirelessly connected to the stylus, the downlink signal from the stylus may be sampled at the third refresh rate, and the stylus also sends the downlink signal at the third refresh rate. The electronic device may sample the downlink signal from the stylus to keep signal synchronization between the electronic device and the stylus. In addition, the stylus may monitor the uplink signal at the least common multiple of the first refresh rate and the second refresh rate. Because a frequency at which the stylus monitors the uplink signal is a multiple of a frequency at which the electronic device sends the uplink signal, the stylus can monitor every uplink signal from the electronic device, and then can detect switching of the refresh rate of the stylus in a timely manner. The stylus can detect the refresh rate of the electronic device in a timely manner without performing signaling interaction with the electronic device, thereby achieving a small time delay and high efficiency.

In a possible implementation, during a wireless connection of the electronic device and the stylus, the electronic device sends the first refresh rate and the second refresh rate supported by the electronic device to the stylus. Alternatively, in a possible implementation, after the electronic device is wirelessly connected to the stylus and before the electronic device sends the uplink signal to the stylus, the electronic device may send the first refresh rate and the second refresh rate supported by the electronic device to the stylus. In a possible implementation, the first refresh rate and the second refresh rate supported by the electronic device may be stored in the stylus, where the first refresh rate and the second refresh rate may be produced at a manufacturing stage of the stylus or sent by the electronic device and then stored by the stylus when the stylus is first connected to the electronic device.

In an embodiment, the third refresh rate is equal to the first refresh rate, That is, after being wirelessly connected to the stylus, the electronic device may send the uplink signal to the stylus at the first refresh rate, and sample the downlink signal based on the first refresh rate. Correspondingly, the stylus sends the downlink signal based on the first refresh rate, and samples the uplink signal from the electronic device at the fourth refresh rate.

In this embodiment, when the stylus detects that the electronic device is switched from the first refresh rate to the second refresh rate, the stylus sends the downlink signal to the electronic device based on the second refresh rate, and samples the uplink signal from the electronic device at the fourth refresh rate. The switching of the electronic device from the first refresh rate to the second refresh rate represents: the electronic device sends the uplink signal to the stylus at the second refresh rate, and samples the downlink signal from the stylus based on the second refresh rate.

The stylus may detect a period of the uplink signal from the electronic device and determine whether the electronic device is switched from the first refresh rate to the second refresh rate. If the period changes, it is determined that the electronic device is switched from the first refresh rate to the second refresh rate; or if the period does not change, it is determined that the first refresh rate of the electronic device has not changed.

In a possible implementation, the third refresh rate is equal to the second refresh rate. That is, after being wirelessly connected to the stylus, the electronic device may send the uplink signal to the stylus at the second refresh rate, and sample the downlink signal based on the second refresh rate. Correspondingly, the stylus sends the downlink signal based on the second refresh rate, and samples the uplink signal from the electronic device at the fourth refresh rate.

In this embodiment, when the stylus detects that the electronic device is switched from the second refresh rate to the first refresh rate, the stylus sends the downlink signal to the electronic device based on the first refresh rate, and samples the uplink signal from the electronic device at the fourth refresh rate.

In this embodiment of this application, the stylus may monitor the uplink signal from the electronic device based on the least common multiple of the first refresh rate and the second refresh rate, and detect whether the refresh rate of the electronic device changes. If it is detected that the refresh rate of the electronic device is switched from the first refresh rate to the second refresh rate, the stylus may send the downlink signal based on the second refresh rate, thereby ensuring signal synchronization with the electronic device.

In a possible implementation, the third refresh rate is equal to the second refresh rate, and the second refresh rate is greater than the first refresh rate. That is, after being wirelessly connected to the stylus, the electronic device may sample the downlink signal at the maximum refresh rate supported by the electronic device. Correspondingly, the stylus also sends the downlink signal based on the maximum refresh rate supported by the electronic device, and samples the uplink signal from the electronic device at the fourth refresh rate.

In this embodiment of this application, because the refresh rate at which the electronic device samples the downlink signal is the same as the refresh rate at which the stylus sends the downlink signal, the electronic device can keep synchronization with the stylus, and can also ensure that the signals of the electronic device and the stylus are synchronized in real time when the electronic device switches the refresh rate.

In a possible implementation, the third refresh rate is equal to the second refresh rate, and the second refresh rate is greater than the first refresh rate. In this embodiment of this application, after the electronic device is wirelessly connected to the stylus, the electronic device may send the uplink signal to the stylus at the first refresh rate or at the second refresh rate, and the electronic device samples a user signal based on the second refresh rate while sampling the downlink signal based on the second refresh rate. The user signal is a signal that a user touches a touch screen of the electronic device. The electronic device sampling the user signal may be referred to as a report point.

In this embodiment of this application, the electronic device samples the user signal at the maximum refresh rate supported by the electronic device. Therefore, when the electronic device sends the uplink signal at the first refresh rate, the report points are not uniform and have a low signal-to-noise ratio, which affects response quality of the electronic device when the user touches the touch screen of the electronic device, and further affects user experience.

In a possible implementation, a first uplink signal is any uplink signal from the electronic device, the electronic device sends the first uplink signal to the stylus at the first refresh rate, and after sampling the user signal based on the second refresh rate, the method further includes: the electronic device continues to sample the user signal until the electronic device sends a second uplink signal, where the second uplink signal is the first one following the first uplink signal.

The quantity of times the electronic device continues to sample the user signal is a preset quantity. That is, the electronic device may continue to sample a predetermined quantity of user signals after sampling the last user signal within a period of one uplink signal. In a possible implementation, the electronic device may continue to sample the user signal based on the second refresh rate. That is, the electronic device maintains a report point frequency, and increases test points (that is, continues to sample the user signal) at the same report point frequency after sampling the last user signal.

In this embodiment of this application, when the electronic device samples the downlink signal based on the maximum refresh rate supported by the electronic device, the electronic device may sample the user signal based on the maximum refresh rate supported by the electronic device, and the electronic device may supplement the report points in a report point blank area, thereby improving the uniformity and the signal-to-noise ratio of the report points, so as to improve the quality of the electronic device in detecting the user signal.

According to a second aspect, an embodiment of this application provides a signal synchronization method, applied to a stylus. The method may include: after being wirelessly connected to an electronic device, sending a downlink signal to the electronic device based on a third refresh rate, and sampling an uplink signal from the electronic device at a fourth refresh rate, where the fourth refresh rate is the least common multiple of a first refresh rate and a second refresh rate, the electronic device supports the first refresh rate and the second refresh rate, and the third refresh rate is equal to the first refresh rate or the second refresh rate.

In a possible implementation, before the sending a downlink signal to the electronic device based on a third refresh rate, the method further includes: receiving a first refresh rate and a second refresh rate supported by the electronic device from the electronic device.

In a possible implementation, the third refresh rate is equal to the first refresh rate, and the method further includes: when detecting that the electronic device is switched from the first refresh rate to the second refresh rate, sending the downlink signal to the electronic device based on the second refresh rate, and sampling the uplink signal from the electronic device at the fourth refresh rate. The switching of the electronic device from the first refresh rate to the second refresh rate represents: the electronic device sends the uplink signal to the stylus at the second refresh rate, and samples the downlink signal from the stylus based on the second refresh rate.

In a possible implementation, the method further includes: detecting a period of the uplink signal from the electronic device, and determining whether the electronic device is switched from the first refresh rate to the second refresh rate; and if the period changes, determining that the electronic device is switched from the first refresh rate to the second refresh rate.

In a possible implementation, the third refresh rate is equal to the second refresh rate, and the second refresh rate is greater than the first refresh rate.

In a possible implementation, the first refresh rate is 60 Hz, and the second refresh rate is 90 Hz.

According to a third aspect, an embodiment of this application provides a signal synchronization method, applied to an electronic device, where the electronic device supports a first refresh rate and a second refresh rate. The method includes: after the electronic device is wirelessly connected to a stylus, sampling a downlink signal from the stylus based on a third refresh rate, where the third refresh rate is equal to the first refresh rate or the second refresh rate.

In a possible implementation, before the sampling a downlink signal from the stylus based on a third refresh rate, the method further includes: sending the first refresh rate and the second refresh rate supported by the electronic device to the stylus.

In a possible implementation, the third refresh rate is equal to the first refresh rate; and after the electronic device is wirelessly connected to a stylus, the method further includes: sending an uplink signal to the stylus at the first refresh rate.

In a possible implementation, the third refresh rate is equal to the second refresh rate, and the second refresh rate is greater than the first refresh rate.

In a possible implementation, after the electronic device is wirelessly connected to the stylus, the method further includes: sending an uplink signal to the stylus at the first refresh rate or the second refresh rate; and sampling a user signal based on the second refresh rate, where the user signal is a signal that a user touches a touch screen of the electronic device.

In a possible implementation, a first uplink signal is any uplink signal from the electronic device; and after sending the first uplink signal to the stylus at the first refresh rate, and sampling the user signal based on the second refresh rate, the method further includes: continuing to sample the user signal until a second uplink signal is sent, where the second uplink signal is the first one following the first uplink signal.

In a possible implementation, the quantity of times to continue to sample the user signal is a preset quantity.

In a possible implementation, the continuing to sample the user signal includes: continuing to sample the user signal based on the second refresh rate.

In a possible implementation, the first refresh rate is 60 Hz, and the second refresh rate is 90 Hz.

According to a fourth aspect, an embodiment of this application provides a stylus, including a processor and a memory, where the memory stores computer executable instructions, and the processor executes the computer executable instructions stored in the memory, to enable the processor to perform the method of the second aspect.

According to a fifth aspect, an embodiment of this application provides an electronic device, including a processor and a memory, where the memory stores computer executable instructions, and the processor executes the computer executable instructions stored in the memory, to enable the processor to perform the method of the third aspect.

According to a sixth aspect, an embodiment of this application provides a signal synchronization system, including the stylus according to the fourth aspect and the electronic device according to the fifth aspect.

According to a seventh aspect, an embodiment of this application provides a computer program product including instructions, where when the instructions are run on a computer, the computer is enabled to perform the methods according to the second aspect and the third aspect.

According to an eighth aspect, an embodiment of this application provides a computer-readable storage medium, where the computer-readable storage medium stores instructions, and when the instructions are run on a computer, the computer is enabled to perform the methods according to the second aspect and the third aspect.

For beneficial effects of the possible implementations of the second aspect to the eighth aspect, reference may be made to the beneficial effects brought by the first aspect and the possible implementations of the first aspect, and details are not described herein again.

Embodiments of this application provide a method applied to a signal synchronization system, a system, a stylus, and an electronic device. The system includes a stylus and an electronic device. The electronic device supports a first refresh rate and a second refresh rate. The method includes: after an electronic device is wirelessly connected to a stylus, the electronic device samples a downlink signal from the stylus based on a third refresh rate, where the third refresh rate is equal to a first refresh rate or a second refresh rate; and the stylus sends the downlink signal to the electronic device based on the third refresh rate, and samples an uplink signal from the electronic device at a fourth refresh rate, where the fourth refresh rate is the least common multiple of the first refresh rate and the second refresh rate. In the embodiments of this application, after the stylus is connected to the electronic device, the uplink signal from the electronic device may be monitored by the least common multiple of all refresh rates supported by the electronic device. Therefore, every uplink signal from the electronic device can be monitored, and then the switching of the refresh rate of the electronic device can be detected in a timely manner, thereby achieving a small time delay and high efficiency.

DESCRIPTION OF EMBODIMENTS

Figure 1:
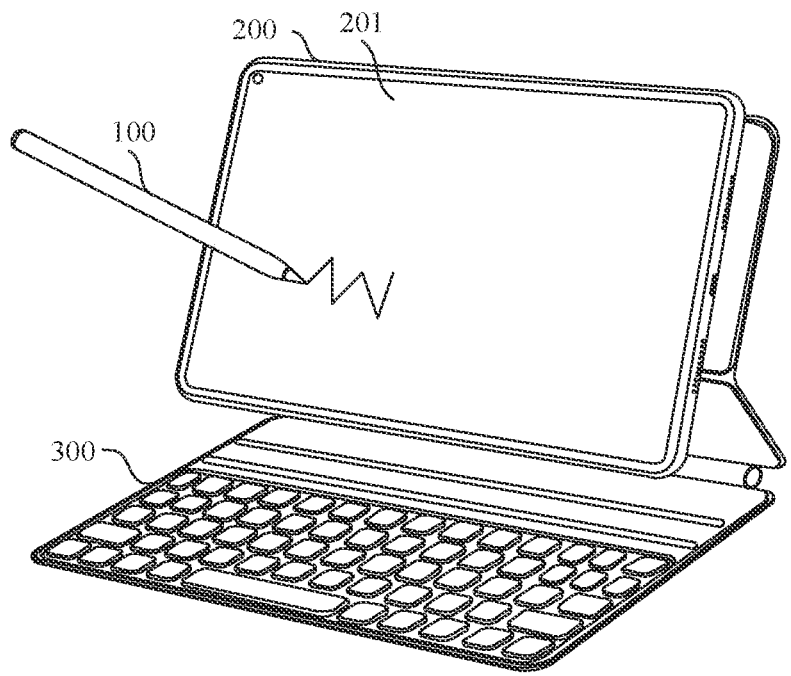
FIG. 1 is a schematic diagram of a scenario to which an embodiment of this application is applicable.

FIG. 1 is a schematic diagram of a scenario to which an embodiment of this application is applicable. Referring to FIG. 1, the scenario includes a stylus (stylus) 100, an electronic device 200, and a wireless keyboard 300. In FIG. 1, a tablet computer (tablet) is used as an example of the electronic device 200 for description. The stylus 100 and the wireless keyboard 300 may provide inputs to the electronic device 200, and in response to the input, the electronic device 200 performs an operation based on the input of the stylus 100 or the wireless keyboard 300. A touch area may be disposed on the wireless keyboard 300. The stylus 100 may operate the touch area of the wireless keyboard 300 to provide an input to the wireless keyboard 300, and the wireless keyboard 300 may perform an operation in response to the input based on the input of the stylus 100. In an embodiment, the stylus 100 and the electronic device 200, the stylus 100 and the wireless keyboard 300, and the electronic device 200 and the wireless keyboard 300 may be interconnected through a communication network, to implement interaction between wireless signals. The communication network may be, but is not limited to, a short-range communication network, such as a Wi-Fi hotspot network, a Wi-Fi peer-to-peer (peer-to-peer, P2P) network, a Bluetooth network, a zigbee network, or a near field communication (near field communication, NFC) network.

The stylus 100 may be, but is not limited to, an inductive stylus and a capacitive stylus. The electronic device 200 has a touch screen 201. When the stylus 100 is an inductive stylus, an electromagnetic induction board needs to be integrated on the touch screen 201 of the electronic device 200 that interacts with the stylus 100. A coil is distributed on the electromagnetic induction board, and a coil is also integrated in the inductive stylus. According to an electromagnetic induction principle, the inductive stylus can accumulate electric energy with movement of the inductive stylus in a magnetic field range generated by the electromagnetic induction board. The inductive stylus can transmit the accumulated electric energy to the electromagnetic induction board through the coil in the inductive stylus and free oscillation. The electromagnetic induction board may scan the coil on the electromagnetic induction board based on the electric energy from the inductive stylus, and calculate a position of the inductive stylus on the touch screen 201. The touch screen 201 in the electronic device 200 may also be referred to as a touch screen 201, and the stylus 201 may also be referred to as a stylus pen.

The capacitive stylus may include a passive capacitive stylus and an active capacitive stylus. The passive capacitive stylus may be referred to as a passive capacitive stylus, and the active capacitive stylus may be referred to as an active capacitive stylus.

One or more electrodes may be disposed in the active capacitive stylus (for example, a stylus tip). The active capacitive stylus may transmit a signal through the electrode. When the stylus 100 is the active capacitive stylus, an electrode array needs to be integrated on the touch screen 201 of the electronic device 200 interacting with the stylus 100. In an embodiment, the electrode array may be a capacitive electrode array. The electronic device 200 may receive a signal from the active capacitive stylus through the electrode array, and when receiving the signal, identify a position of the active capacitive stylus on the touch screen and an inclination angle of the active capacitive stylus based on a change in a capacitance value on the touch screen 201.

Figure 2A:
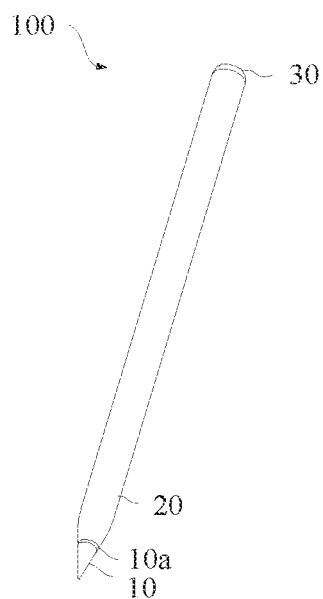
FIG. 2A is a schematic diagram of a structure of a stylus according to an embodiment of this application.

FIG. 2A is a schematic diagram of a structure of a stylus according to an embodiment of this application. Referring to FIG. 2A, the stylus 100 may include a stylus tip 10, a stylus rod 20, and a rear cover 30. The inside of the stylus rod 20 is in a hollow structure. The stylus tip 10 and the rear cover 30 are respectively located at two ends of the stylus rod 20. The rear cover 30 and the stylus rod 20 may be connected through plugging or snapping. For a fitting relationship between the stylus tip 10 and the stylus rod 20, refer to the description in FIG. 2B.

Figure 2B:
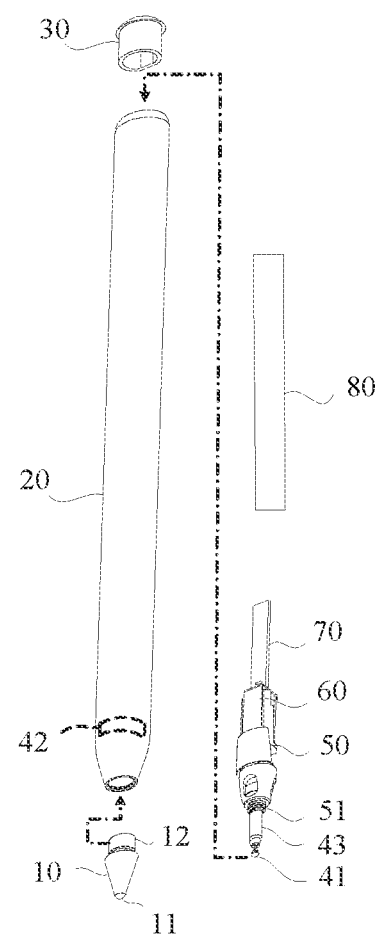
FIG. 2B is a schematic diagram of a partially split structure of a stylus according to an embodiment of this application.

FIG. 2B is a schematic diagram of a partially split structure of a stylus according to an embodiment of this application. Referring to FIG. 2B, the stylus 100 further includes a main shaft assembly 50. The main shaft assembly 50 is located in the stylus rod 20, and the main shaft assembly 50 is slidably disposed in the stylus rod 20. The main shaft assembly 50 has an external screw thread 51, and the stylus tip 10 includes a writing end 11 and a connecting end 12. The connecting end 12 of the stylus tip 10 has an internal screw thread (not shown) fitting the external screw thread 51.

When the main shaft assembly 50 is assembled into the stylus rod 20, the connecting end 12 of the stylus tip 10 extends into the stylus rod 20 and is threadedly connected to the external screw thread 51 of the main shaft assembly 50. In some other examples, the connecting end 12 of the stylus tip 10 may alternatively be connected to the main shaft assembly 50 in a detachable manner such as snapping. The connecting end 12 of the stylus tip 10 is detachably connected to the main shaft assembly 50, to implement replacement of the stylus tip 10.

To detect pressure applied to the writing end 11 of the stylus tip 10, as shown in FIG. 2A, there is a gap 10a between the stylus tip 10 and the stylus rod 20. In this way, it can be ensured that when the writing end 11 of the stylus tip 10 is subjected to an external force, the stylus tip 10 can move toward the stylus rod 20, and movement of the stylus tip 10 drives the main shaft assembly 50 to move in the stylus rod 20. To detect the external force, as shown in FIG. 2B, a pressure sensing component 60 is disposed on the main shaft assembly 50. A part of the pressure sensing component 60 is fixedly connected to a fastener in the stylus rod 20, and a part of the pressure sensing component 60 is fixedly connected to the main shaft assembly 50. In this way, when the main shaft assembly 50 moves with the stylus tip 10, because the part of the pressure sensing component 60 is fixedly connected to the fastener in the stylus rod 20, movement of the main shaft assembly 50 drives deformation of the pressure sensing component 60, and deformation of the pressure sensing component 60 is transmitted to a circuit board 70 (for example, the pressure sensing component 60 and the circuit board 70 can be electrically connected by using a wire or a flexible circuit board). The circuit board 70 detects the pressure of the writing end 11 of the stylus tip 10 based on deformation of the pressure sensing component 60, and therefore controls a line thickness of the writing end 11 based on the pressure of the writing end 11 of the stylus tip 10.

It should be noted that detection of the pressure of the stylus tip 10 includes but is not limited to the foregoing method. For example, a pressure sensor may be further disposed at the writing end 11 of the stylus tip 10, and the pressure of the stylus tip 10 is detected by the pressure sensor.

In this embodiment, as shown in FIG. 2B, the stylus 100 further includes a plurality of electrodes. The plurality of electrodes may be, for example, a first transmitting electrode 41, a ground electrode 43, and a second transmitting electrode 42. The first transmitting electrode 41, the ground electrode 43, and the second transmitting electrode 42 are electrically connected to the circuit board 70. The first transmitting electrode 41 may be located in the stylus tip 10 and close to the writing end 11. The circuit board 70 may be configured to provide a signal control board to each of the first transmitting electrode 41 and the second transmitting electrode 42, and the first transmitting electrode 41 is configured to transmit a first signal. When the first transmitting electrode 41 is close to the touch screen 201 of the electronic device 200, a coupling capacitance may be formed between the first transmitting electrode 41 and the touch screen 201 of the electronic device 200, so that the electronic device 200 can receive the first signal. The second transmitting electrode 42 is configured to transmit a second signal, and the electronic device 200 can determine an inclination angle of the stylus 100 based on the received second signal. In this embodiment of this application, the second transmitting electrode 42 may be located on an inner wall of the stylus rod 20. In an example, the second transmitting electrode 42 may alternatively be located on the main shaft assembly 50.

The ground electrode 43 may be located between the first transmitting electrode 41 and the second transmitting electrode 42, or the ground electrode 43 may be located at the outer periphery of the first transmitting electrode 41 and the second transmitting electrode 42. The ground electrode 43 is used to reduce coupling between the first transmitting electrode 41 and the second transmitting electrode 42.

When the electronic device 200 receives a first signal from the stylus 100, a capacitance value at a corresponding position on the touch screen 201 changes. Based on this, the electronic device 200 may determine a position of the stylus 100 (or the stylus tip of the stylus 100) on the touch screen 201 based on the change in the capacitance value on the touch screen 201, In addition, the electronic device 200 may obtain the inclination angle of the stylus 100 by using a double-tip projection method in an inclination angle detection algorithm. Because positions of the first transmitting electrode 41 and the second transmitting electrode 42 in the stylus 100 are different, when the electronic device 200 receives the first signal and a second signal from the stylus 100, capacitance values at the two positions on the touch screen 201 change. The electronic device 200 may obtain the inclination angle of the stylus 100 based on a distance between the first transmitting electrode 41 and the second transmitting electrode 42 and a distance between the two positions at which the capacitance values on the touch screen 201 change. For more details about obtaining the inclination angle of the stylus IOU, refer to related descriptions of the double-tip projection method in the conventional technology.

In this embodiment of this application, as shown in FIG. 2B, the stylus 100 further includes a battery assembly 80, where the battery assembly 80 is configured to supply power to the circuit board 70. The battery assembly 80 may include a lithium-ion battery, or the battery assembly 80 may include a nickel-chromium battery, an alkaline battery, a nickel-metal hydride battery, or the like. In an embodiment, the battery included in the battery pack 80 may be a rechargeable battery or a disposable battery. When the battery included in the battery pack 80 is a rechargeable battery, the stylus 100 can charge the battery in the battery pack 80 through wireless charging.

Figure 3:
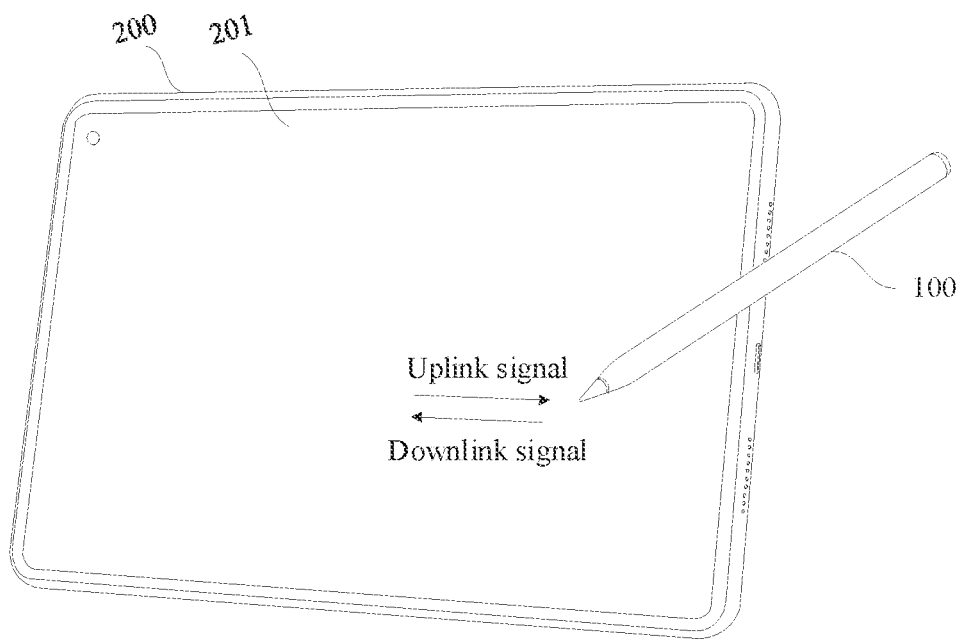
FIG. 3 is a schematic diagram showing interaction between a stylus and an electronic device according to an embodiment of this application.

When the stylus 100 is an active capacitive stylus, as shown in FIG. 3, after the electronic device 200 is wirelessly connected to the stylus 100, the electronic device 200 may send an uplink signal to the stylus 100 through an electrode array integrated on the touch screen 201. The stylus 100 may receive the uplink signal through a receiving electrode, and the stylus 100 transmits a downlink signal through a transmitting electrode (for example, the first transmitting electrode 41 and the second transmitting electrode 42). The downlink signal includes the first signal and the second signal. When the stylus tip 10 of the stylus 100 is in contact with the touch screen 201, the capacitance value at the corresponding position on the touch screen 201 changes, and the electronic device 200 may determine a position of the stylus tip 10 of the stylus 100 on the touch screen 201 based on the capacitance value on the touch screen 201. In an embodiment, an uplink signal and a downlink signal may be square wave signals.

Figure 4:
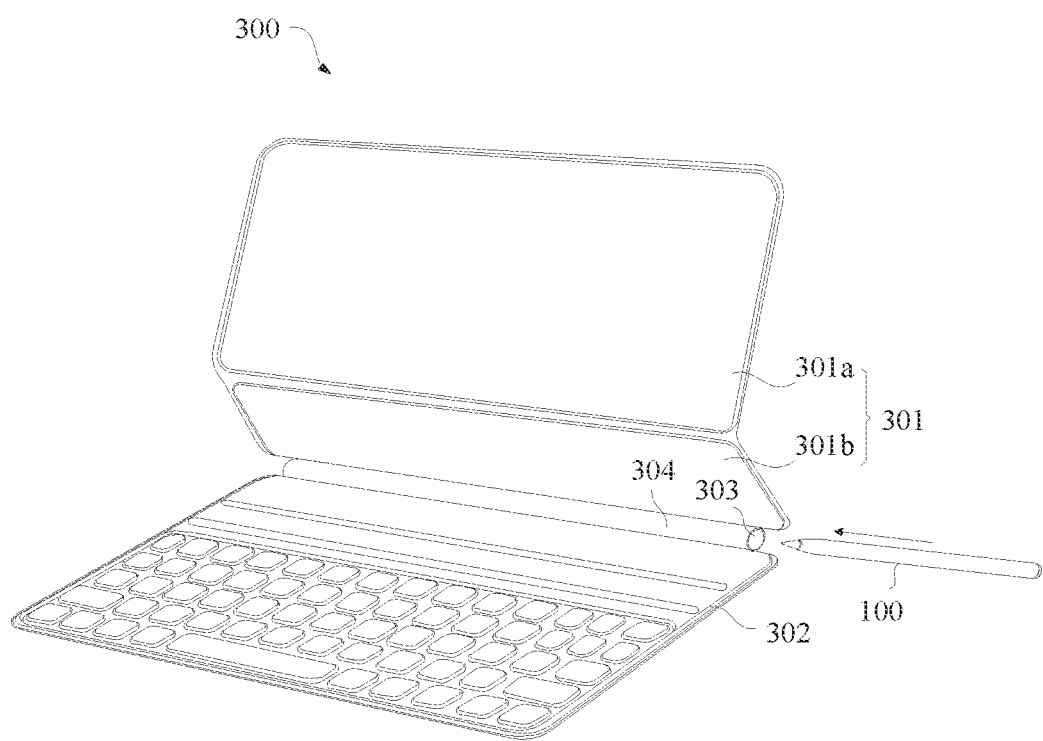
FIG. 4 is a schematic diagram showing assembling of a stylus and a wireless keyboard according to an embodiment of this application.

In an embodiment, as shown in FIG. 4, the wireless keyboard 300 may include a first portion 301 and a second portion 302. For example, the wireless keyboard 300 may include a keyboard body and a keyboard cover. The first portion 301 may be the keyboard cover, and the second portion 302 may be the keyboard body. The first portion 301 is configured to place the electronic device 200, and the second portion 302 may be provided with a key, a touchpad, or the like for a user operation.

When the wireless keyboard 300 is used, the first portion 301 and the second portion 302 of the wireless keyboard 300 need to be opened. When the wireless keyboard 300 is not used, the first portion 301 and the second portion 302 of the wireless keyboard 300 can be closed. In an embodiment, the first portion 301 and the second portion 302 of the wireless keyboard 300 are rotatably connected to each other. For example, the first portion 301 and the second portion 302 may be connected by using a rotating shaft or a hinge. Alternatively, in some examples, the first portion 301 and the second portion 302 are rotatably connected by using a flexible material (for example, a leather material or a cloth material). Alternatively, in some examples, the first portion 301 and the second portion 302 may be integrally formed, and a connection part between the first portion 301 and the second portion 302 is thinned, so that the connection part between the first portion 301 and the second portion 302 can be bent. A manner of the connection between the first portion 301 and the second portion 302 may include but is not limited to the foregoing rotational connection manners.

The first portion 301 may include at least two rotatably connected supports. For example, as shown in FIG. 4, the first portion 301 includes a first support 301a and a second support 301b. The first support 301a and the second support 301b are rotatably connected to each other. During use, the first support 301a and the second support 301b may be used to jointly support the electronic device 200 (for details, refer to FIG. 1). Alternatively, the first support 301a supports the second support 301b, and the second support 301b supports the electronic device 200. Referring to FIG. 4, the second support 301b and the second portion 302 are rotatably connected to each other.

As shown in FIG. 4, to accommodate the stylus 100, the wireless keyboard 300 may be provided with an accommodating portion 303 for accommodating the stylus 100. As shown in FIG. 4, the accommodating portion 303 is a cylindrical cavity. During accommodating, the stylus 100 is inserted into the accommodating cavity along an arrow direction in FIG. 4. In this embodiment, as shown in FIG. 4, the second portion 302 and the second support 301h are rotatably connected to each other through a connecting portion 304, and the accommodating portion 303 is disposed in the connecting portion 304. The connecting portion 304 may be a rotating shaft.

Figure 5A:
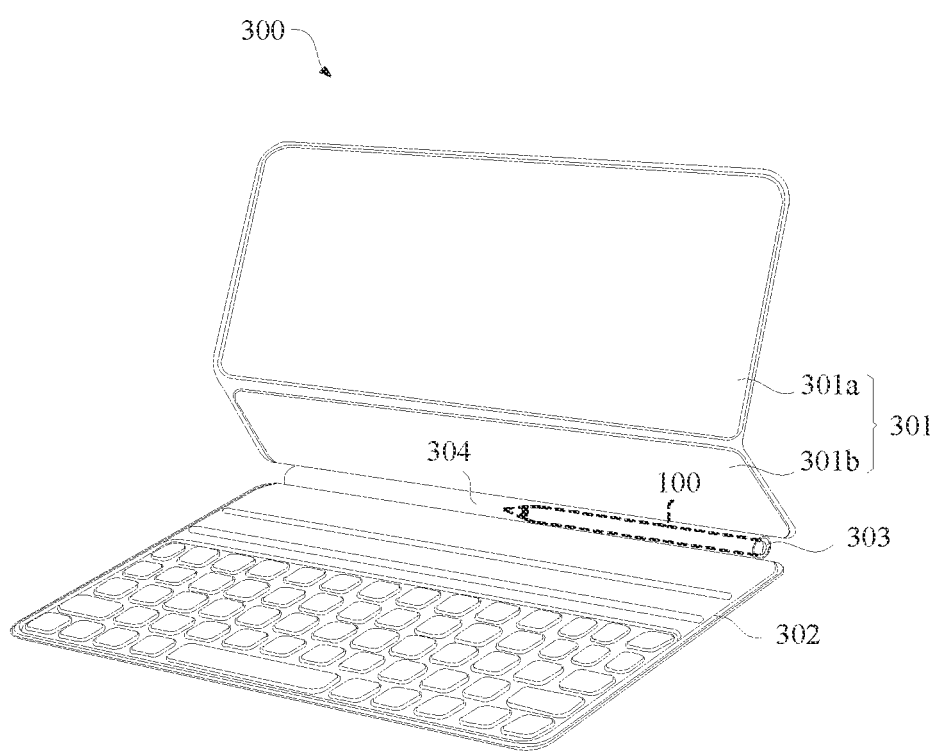
FIG. 5A is a schematic diagram in which a stylus is accommodated in an accommodating portion of a wireless keyboard according to an embodiment of this application.
Figure 5B:
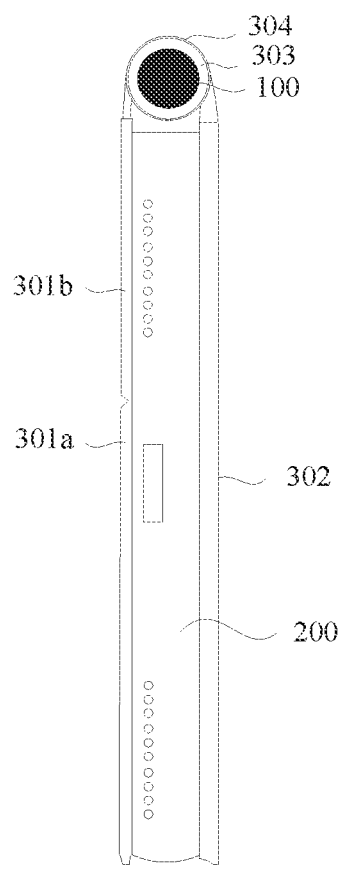
FIG. 5B is a schematic side view when a stylus is accommodated in an accommodating portion of a wireless keyboard according to an embodiment of this application.

FIG. 5A is a schematic diagram in which a stylus is accommodated in an accommodating portion of a wireless keyboard according to an embodiment of this application. FIG. 5B is a schematic side view when a stylus is accommodated in an accommodating portion of a wireless keyboard according to an embodiment of this application. Referring to FIG. 5B, the accommodating portion 303 is a circular cavity, and an inner diameter of the accommodating portion 303 is greater than an outer diameter of the stylus 100.

In an embodiment, a magnetic material may be disposed on an inner wall of the accommodating portion 303, and a magnetic material may be disposed in the stylus 100, to prevent the stylus 100 from falling out of the accommodating portion 303. The stylus 100 is adsorbed in the accommodating portion 303 through magnetic adsorption between the magnetic materials. Certainly, in some examples, when the stylus 100 is fastened to the accommodating portion 303, the stylus is fastened to the accommodating portion through magnetic adsorption or the like. For example, the stylus 100 may also be fastened to the accommodating portion 303 through snapping.

To facilitate removal of the stylus 100 from the accommodating portion 303, an eject structure may be disposed in the accommodating portion 303. For example, one end of the stylus 100 is pressed, so that the eject mechanism can drive one end of the stylus 100 to eject from the accommodating portion 303.

Figure 6:
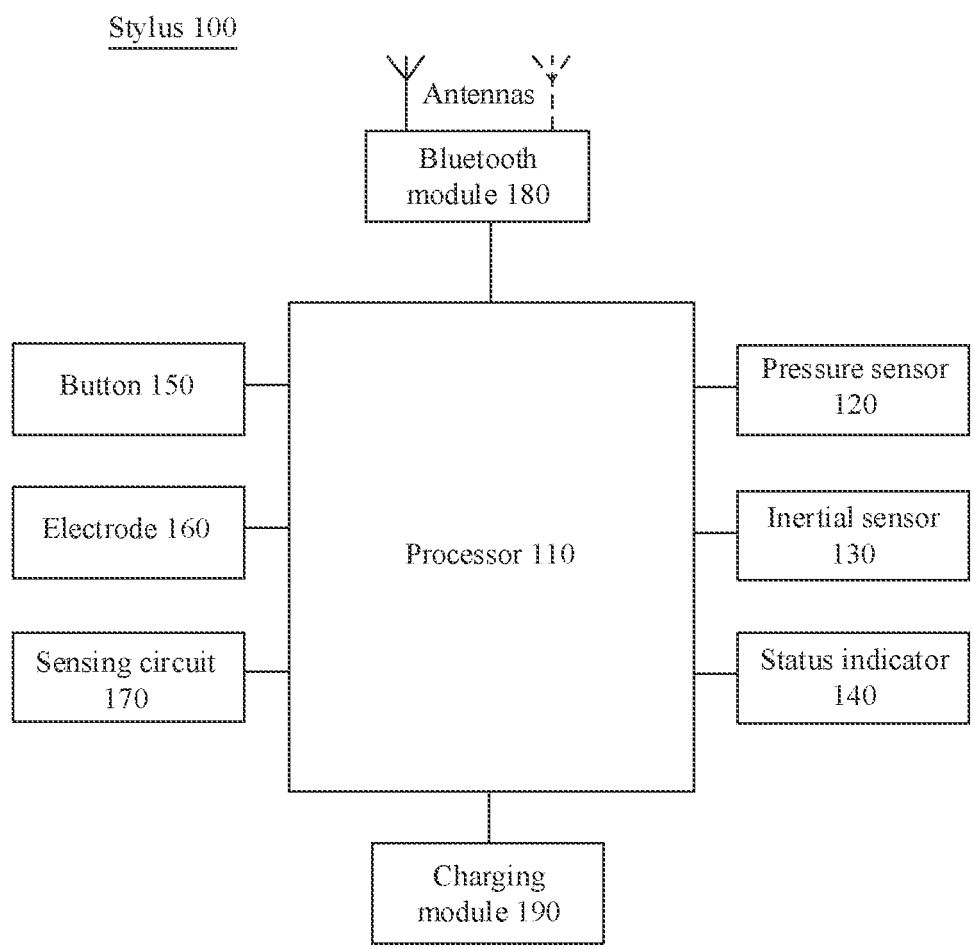
FIG. 6 is a schematic diagram of a hardware structure of a stylus according to an embodiment of this application.

FIG. 6 is a schematic diagram of a hardware structure of a stylus according to an embodiment of this application. Referring to FIG. 6, the stylus 100 may have a processor 110. The processor 110 may include storage and processing circuits configured to support operations of the stylus 100. The storage and processing circuits may include a storage apparatus (for example, a flash memory or another electrical programmable read-only memory configured as a solid-state drive) such as a non-volatile memory or a volatile memory (for example, a static or dynamic random access memory). The processing circuit in the processor 110 may be configured to control an operation of the stylus 100. The processing circuit may be based on one or more microprocessors, microcontrollers, digital signal processors, baseband processors, power management units, audio chips, application-specific integrated circuits, and the like.

The stylus 100 may include one or more sensors. For example, the sensor may include a pressure sensor 120. The pressure sensor 120 may be disposed at the writing end 11 of the stylus 100 (as shown in FIG. 2B). Certainly, the pressure sensor 120 may alternatively be disposed in the stylus rod 20 of the stylus 100. In this way, after one end of the stylus tip 10 of the stylus 100 is forced, the other end of the stylus tip 10 moves to apply force to the pressure sensor 120. In an embodiment, the processor 110 may adjust, based on pressure detected by the pressure sensor 120, a writing line thickness of the stylus tip 10 of the stylus 100.

The sensor may also include an inertial sensor 130. The inertial sensor 130 may include a three-axis accelerometer and a three-axis gyroscope, and; or another component configured to measure movement of the stylus 100. For example, a three-axis magnetometer may be included in the sensor in a configuration of a nine-axis inertial sensor. The sensor may also include an additional sensor, such as a temperature sensor, an ambient light sensor, an optical proximity sensor, a contact sensor, a magnetic sensor, a pressure sensor, and/or another sensor.

The stylus 100 may include a status indicator 140 such as a light-emitting diode and a button 150. The status indicator 140 is configured to prompt a user with a status of the stylus 100. The button 150 may include a mechanical button and a non-mechanical button, and the button 150 may be configured to collect button pressing information from the user.

In this embodiment of this application, the stylus 100 may include one or more electrodes 160 (for details, refer to the descriptions in FIG. 2B), one electrode 160 may be located at the writing end of the stylus 100, and one electrode 160 may be located in the stylus tip 10. For details, refer to the foregoing related descriptions.

The stylus 100 may include a sensing circuit 170. The sensing circuit 170 may sense capacitive coupling between the electrode 160 and a drive line on a capacitive touch sensor panel interacting with the stylus 100. The sensing circuit 170 may include an amplifier configured to receive a capacitance reading from the capacitive touch sensor panel, a clock configured to generate a demodulation signal, a phase shifter configured to generate a phase shifted demodulation signal, a mixer configured to demodulate the capacitance reading by using an in-phase demodulation frequency component, a mixer configured to demodulate the capacitance reading by using a quadrature demodulation frequency component, or the like. A demodulation result of the mixer may be used to determine an amplitude proportional to a capacitance, so that the stylus 100 can sense contact with the capacitive touch sensor panel.

It may be understood that the stylus 100 may include a microphone, a speaker, an audio generator, a vibrator, a camera, a data port, and another device based on an actual requirement. The user may use these devices to provide commands to control operations of the stylus 100 and the electronic device 200 interacting with the stylus 100, and receive status information and another output.

The processor 110 may be configured to run software on the stylus 100 for controlling the operation of the stylus 100. In an operation process of the stylus 100, the software running on the processor 110 may process a sensor input, a button input, and an input from another apparatus to monitor movement of the stylus 100 and an input of another user. The software running on the processor 110 may detect a user command and may communicate with the electronic device 200.

To support wireless communication between the stylus 100 and the electronic device 200, the stylus 100 may include a wireless module. In FIG. 6, an example in which the wireless module is a Bluetooth module 180 is used for description. The wireless module may alternatively be a Wi-Fi hotspot module, a Wi-Fi peer-to-peer module, or the like. The Bluetooth module 180 may include a radio frequency transceiver, for example, a transceiver. The Bluetooth module 180 may also include one or more antennas. The transceiver may transmit and/or receive a wireless signal through the antenna. The wireless signal may be a Bluetooth signal, a wireless local area network signal, a remote signal such as a cellular phone signal, a near field communication signal, or another wireless signal based on a type of the wireless module.

The stylus 100 may further include a charging module 190. The charging module 190 may support charging of the stylus 100 to supply power to the stylus 100.

It should be understood that the electronic device 200 in this embodiment of this application may be referred to as user equipment (user equipment, UE), a terminal (terminal), or the like. For example, the electronic device 200 may be a mobile terminal or a fixed terminal including a touch screen, for example, a tablet (portable android device, PAD), a personal digital assistant (personal digital assistant, PDA), a handheld device having a wireless communication function, a computing device, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the terminal device is not specifically limited in this embodiment of this application.

Figure 7:
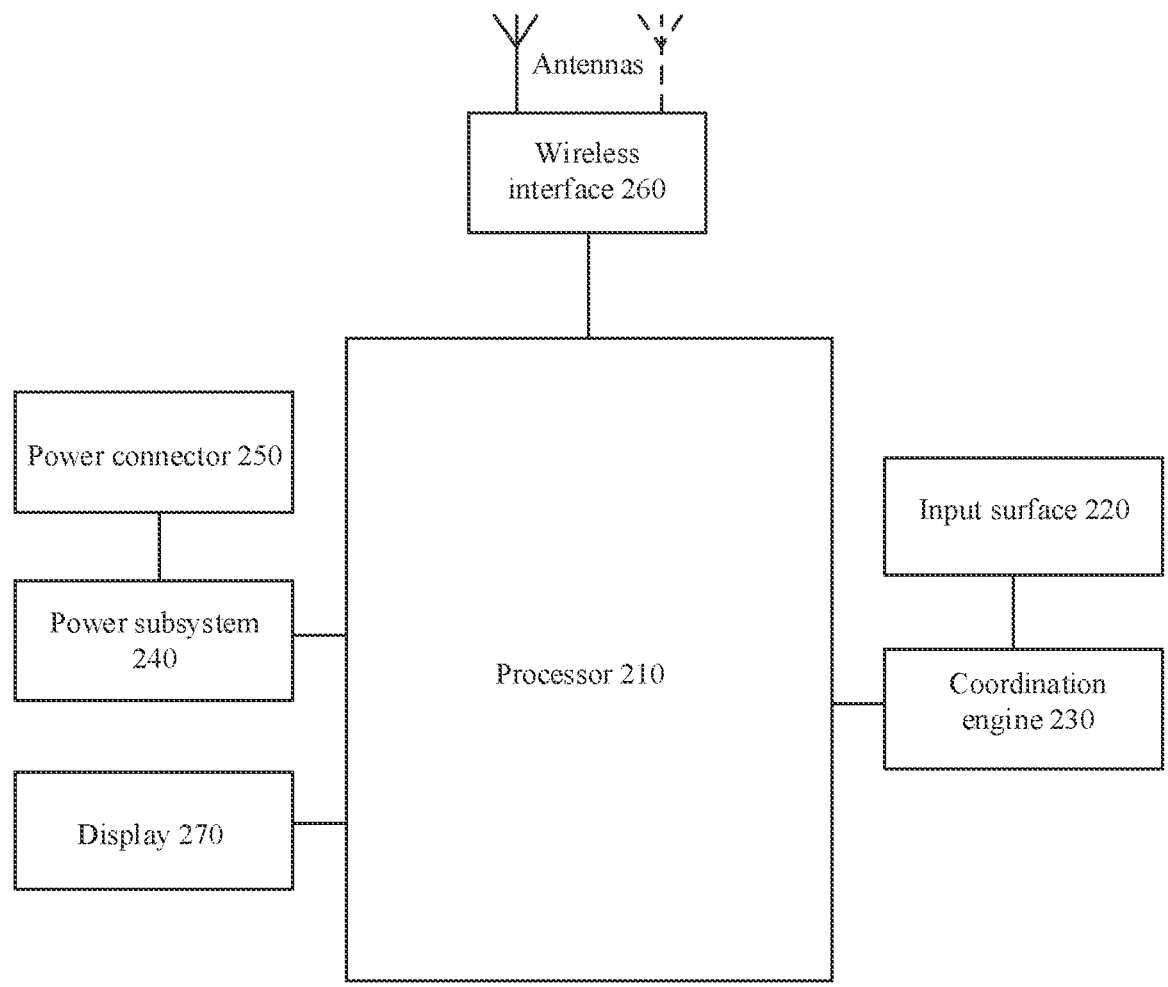
FIG. 7 is a schematic diagram of a hardware structure of an electronic device according to an embodiment of this application.

FIG. 7 is a schematic diagram of a hardware structure of an electronic device according to an embodiment of this application. Referring to FIG. 7, the electronic device 200 may include a plurality of subsystems. The subsystems cooperate to perform, coordinate, or monitor one or more operations or functions of the electronic device 202. The electronic device 200 includes a processor 210, an input surface 220, a coordination engine 230, a power subsystem 240, a power connector 250, a wireless interface 260, and a display 270.

For example, the coordination engine 230 may be configured to: communicate with another subsystem of the electronic device 200 and/or process data; communicate with and/or transact data with the stylus 100; measure and/or obtain one or more outputs of one or more analog or digital sensors (for example, touch sensors); measure and/or obtain one or more outputs of one or more sensor nodes in a sensor node array (for example, a capacitive sensing node array); receive and position a tip signal and a ring signal from the stylus 100; position the stylus 100 based on positions of a tip signal crossing area and a ring signal crossing area, and the like.

The coordination engine 230 of the electronic device 200 includes or may be communicatively coupled, in another manner, to a sensor layer located below the input surface 220 or integrated with the input surface 220. The coordination engine 230 uses the sensor layer to position the stylus 100 on the input surface 220, and uses the technology described in this specification to estimate an angular position of the stylus 100 relative to a plane of the input surface 220. In an embodiment, the input surface 220 may be referred to as a touch screen 201.

For example, the sensor layer of the coordination engine 230 of the electronic device 200 is a grid of capacitive sensing nodes arranged in columns and rows. More specifically, a column trace array is set to be perpendicular to a row trace array. The sensor layer may be separated from other layers of the electronic device, or the sensor layer may be disposed directly on another layer. The other layers are, for example but not limited to: a display stack layer, a force sensor layer, a digitizer layer, a polarizer layer, a battery layer, a structural or decorative housing layer, and the like.

The sensor layer may operate in a plurality of modes. If the sensor layer operates in mutual capacitance mode, a column trace and a row trace form a single capacitive sensing node (for example, a. "vertical" mutual capacitance) at each overlapping point. If the sensor layer operates in self-capacitive mode, a column trace and a row trace form two (vertically aligned) capacitive sensing nodes at each overlapping point. In another implementation solution, if the sensor layer operates in mutual capacitance mode, adjacent column traces and/or adjacent row traces each may form a single capacitive sensing node (for example, a "horizontal" mutual capacitance). As described foregoing, the sensor layer may monitor a change in a capacitance (for example, a mutual capacitance or a self-capacitance) presented at each capacitive sensing node to detect existence of the stylus tip 10 of the stylus 100 and/or touch of a finger of the user. In many cases, the coordination engine 230 may be configured to detect, through capacitive coupling, the tip signal and the ring signal received from the stylus 100 through the sensor layer.

The tip signal and/or the ring signal may include specific information and/or data that may be configured to enable the electronic device 200 to identify the stylus 100. Such information is usually referred to as "stylus identity" information in this specification. The information and/or the data may be received by the sensor layer, and interpreted, decoded, and/or demodulated by the coordination engine 230.

The processor 210 may use the stylus identity information to receive an input from more than one stylus simultaneously. Specifically, the coordination engine 230 may be configured to transmit, to the processor 210, a position and/or an angular position that are/is of each of several styluses and that are/is detected by the coordination engine 230. In another case, the coordination engine 230 may further transmit, to the processor 210, information about relative positions and/or relative angular positions that are of a plurality of styluses and that are detected by the coordination engine 230. For example, the coordination engine 220 may notify the processor 210 of a position of the detected first stylus relative to the detected second stylus.

In another case, the tip signal and/or the ring signal may further include specific information and/or data used to enable the electronic device 200 to identify a specific user. Such information is usually referred to as "user identity" information in this specification.

The coordination engine 230 may forward the user identity information (if the user identity information can be detected and/or can be restored) to the processor 210. If the user identity information cannot be restored from the tip signal and/or the ring signal, the coordination engine 230 may optionally indicate to the processor 210 that the user identity information is not available. The processor 210 can use the user identity information (or absence of such information) in any suitable manner, including but not limited to: accepting or denying input from the specific user, allowing or denying access to a specific function of the electronic device, and the like. The processor 210 may use the user identity information to simultaneously receive an input from more than one user.

In another case, the tip signal and/or the ring signal may include specific information and/or data that may be configured to enable the electronic device 200 to identify settings or preferences of the user or the stylus 100. Such information is usually referred to as "stylus setting" information in this specification.

The coordination engine 230 may forward the stylus setting information (if the stylus setting information can be detected and/or can be restored) to the processor 210. If the stylus setting information cannot be restored from the tip signal and/or the ring signal, the coordination engine 230 may optionally indicate to the processor 210 that the stylus setting information is not available. The electronic device 200 can use the stylus settings information (or absence of such information) in any suitable manner, including but not limited to: applying a setting to the electronic device, applying a selling to a program running on the electronic device, changing a line thickness, a color, a pattern presented by a graphics program of the electronic device, changing a setting of a video game operated on the electronic device, and the like.

In general, the processor 210 may be configured to perform, coordinate, and/or manage functions of the electronic device 200. Such functions may include, but are not limited to, communicating with and/or exchanging data with other subsystems of the electronic device 200, communicating with and/or exchanging data with the stylus 100, performing data communication and/or data exchange over a wireless interface, performing data communication and/or data exchange over a wired interface, facilitating exchange of power through a wireless (for example, inductive or resonant) or wired interface, receiving position(s) and angular position(s) of one or more styluses, or the like.

The processor 210 may be implemented as any electronic device capable of processing, receiving, or sending data or instructions. For example, the processor may be a microprocessor, a central processing unit, an application-specific integrated circuit, a field programmable gate array, a digital signal processor, an analog circuit, a digital circuit, or a combination of these devices. The processor may be a single-threading processor or a multi-threading processor. The processor may be a single-core processor or a multi-core processor.

During use, the processor 210 may be configured to access a memory that stores instructions. The instructions may be configured to enable the processor to perform, coordinate, or monitor one or more operations or functions of the electronic device 200.

The instructions stored in the memory may be configured to control or coordinate operations of other components of the electronic device 200. The components are, for example but not limited to, another processor, an analog or digital circuit, a volatile or nonvolatile memory module, a display, a speaker, a microphone, a rotary input device, a button, or other physical input devices, a biometric authentication sensor and/or system, a force or touch input/output component, a communications module (for example, a wireless interface and/or a power connector), and/or a haptic device or a haptic feedback device.

The memory may further store electronic data usable by the stylus or the processor. For example, the memory may store electronic data or content (such as a media file, a document, and an application), device settings and preferences, a timing signal and a control signal, data, data structures, or databases used for various modules, a file or a configuration related to detection of a tip signal and/or a ring signal, and the like. The memory may be configured as any type of memory. For example, the memory may be implemented as a random access memory, a read-only memory, a flash memory, a removable memory, another type of storage element, or a combination of these devices.

The electronic device 200 further includes the power subsystem 240. The power subsystem 240 may include a battery or another power supply. The power subsystem 240 may be configured to supply power to the electronic device 200. The power subsystem 240 may be further coupled to the power connector 250. The power connector 250 may be any proper connector or port, and may be configured to receive power from an external power supply and/or configured to supply power to an external load. For example, in some implementation solutions, the power connector 250 may be configured to recharge a battery in the power subsystem 240. In another implementation solution, the power connector 250 may be configured to transmit power stored in (or available to) the power subsystem 240 to the stylus 100.

The electronic device 200 further includes the wireless interface 260 to facilitate electronic communication between the electronic device 200 and the stylus 100. In an implementation solution, the electronic device 200 may be configured to communicate with the stylus 100 through a low energy Bluetooth communication interface or a near field communication interface. In another example, the communication interface facilitates electronic communication between the electronic device 200 and an external communication network, a device, or a platform.

The wireless interface 260 (whether a communication interface between the electronic device 200 and the stylus 100 or another communication interface) may be implemented as one or more wireless interfaces, a Bluetooth interface, a near field communication interface, a magnetic interface, a universal serial bus interface, an inductance interface, a resonant interface, a capacitive coupling interface, a Wi-Fi interface, a TCP/IP interface, a network communication interface, an optical interface, an acoustic interface, or any conventional communication interface.

The electronic device 200 further includes the display 270. The display 270 may be located behind the input surface 220, or may be integrated with the input surface. The display 270 may be communicatively coupled to the processor 210, The processor 210 may present information to a user through the display 270. In many cases, the processor 210 presents, through the display 270, an interface with which a user can interact. In many cases, the user manipulates the stylus 100 to interact with an interface.

It is obvious to a person skilled in the art that some specific details about the electronic device 200 that are presented above may not be required to practice particular implementations or their equivalents. Similarly, another electronic device may include more subsystems, modules, components, and the like. In a proper case, some submodules may be implemented as software or hardware. Therefore, it should be understood that the foregoing descriptions are not intended to be exhaustive or to limit the disclosure to the exact form described in this specification. On the contrary. It is obvious to a person of ordinary skill in the art that many modifications and variations are possible based on the foregoing teachings.

Figure 8:
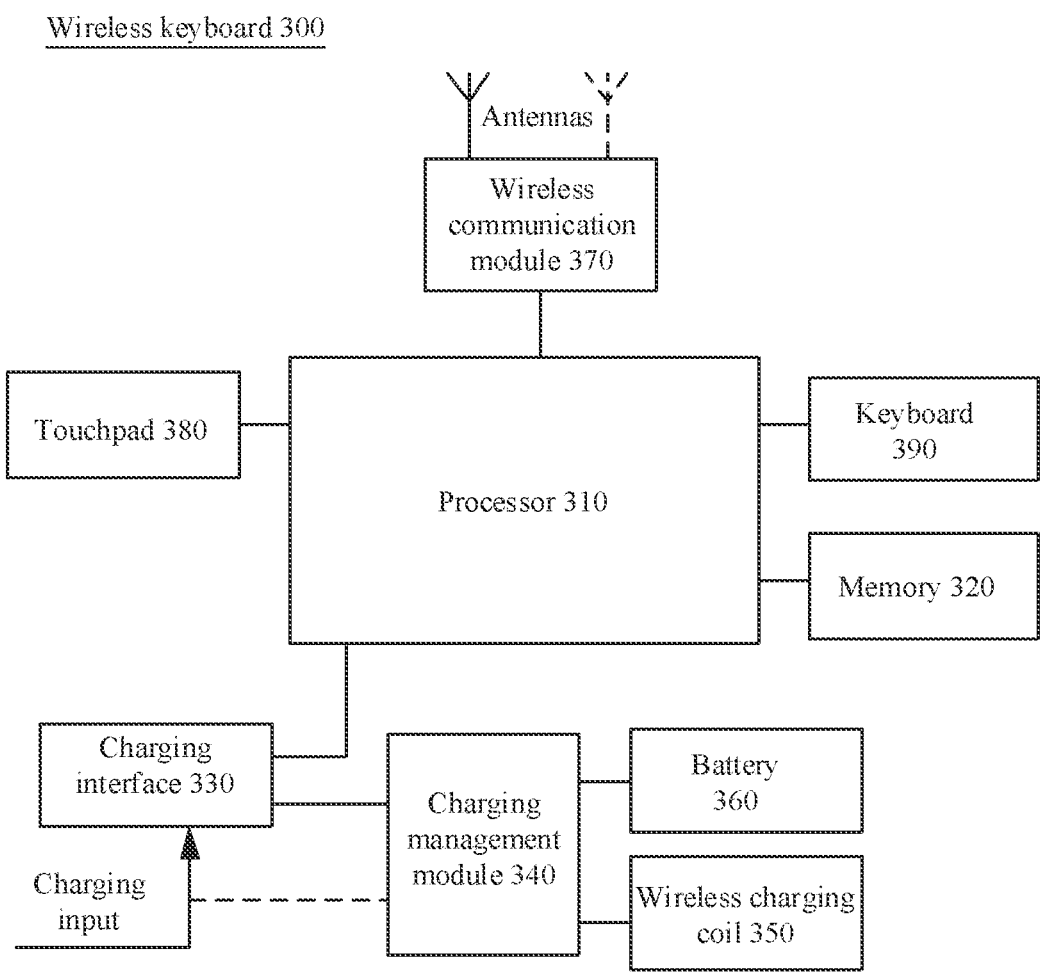
FIG. 8 is a schematic diagram of a hardware structure of a wireless keyboard according to an embodiment of this application.

FIG. 8 is a schematic diagram of a hardware structure of a wireless keyboard according to an embodiment of this application. Referring to FIG. 8, the wireless keyboard 300 may include a processor 310, a memory 320, a charging interface 330, a charging management module 340, a wireless charging coil 350, a battery 360, a wireless communications module 370, a touchpad 380, and a keyboard 390.

The processor 310, the memory 320, the charging interface 330, the charging management module 340, the battery 360, the wireless communications module 370, the touch screen 380, the keyboard 390, and the like may all be disposed on a keyboard body of the wireless keyboard 300 (that is, a second part 302 shown in FIG. 4). The wireless charging coil 350 may be disposed in the connecting portion 304 (shown in FIG. 4) for movably connecting the keyboard body and a support. It may be understood that the structure shown in this embodiment does not constitute a specific limitation on the wireless keyboard 300. In some other embodiments, the wireless keyboard 300 may include more or fewer components than those shown in the figure, or combine some components, or split some components, or have different component arrangements. The components shown in the figure may be implemented in hardware, software, or a combination of software and hardware.

The memory 320 may be configured to store program code, for example, program code used to wirelessly charge the stylus 100. The memory 320 may further store a Bluetooth address for uniquely identifying the wireless keyboard 300. In addition, the memory 320 may further store connection data of an electronic device successfully paired with the wireless keyboard 300. For example, the connection data may be a Bluetooth address of the electronic device successfully paired with the wireless keyboard 300. Based on the connection data, the wireless keyboard 300 can be automatically paired with the electronic device without configuring a connection between the wireless keyboard and the electronic device, for example, performing validity verification. The Bluetooth address may be a media access control (media access control, MAC) address.

The processor 310 may be configured to execute the foregoing application program code, and invoke related modules to implement functions of the wireless keyboard 300 in the embodiments of this application, for example, implement a wired charging function, a reverse wireless charging function, a wireless communication function, and the like of the wireless keyboard 300. The processor 310 may include one or more processing units, and different processing units may be separate devices or may be integrated into one or more processors 310. The processor 310 may be specifically an integrated control chip, or may include a circuit including various active and/or passive components, and the circuit is configured to perform functions of the processor 310 described in this embodiment of this application. The processor of the wireless keyboard 300 may be a microprocessor.

The wireless communication module 370 may be configured to support data exchange in wireless communication that is between the wireless keyboard 300 and another electronic device and that includes Bluetooth (bluetooth, BT), a global navigation satellite system (global navigation satellite system, GNSS), a wireless local area network (wireless local area networks, WLAN) (for example, a wireless fidelity (wireless fidelity, Wi-Fi) network), frequency modulation (frequency modulation, FM), a near field communication (near field communication, NFC) technology, an infrared (infrared, IR) technology, or the like.

In some embodiments, the wireless communications module 370 may be a Bluetooth chip. The wireless keyboard 300 may be a Bluetooth keyboard. The wireless keyboard 300 may be paired with a Bluetooth chip of another electronic device through the Bluetooth chip and establish a wireless connection, to implement wireless communication between the wireless keyboard 300 and the another electronic device through the wireless connection.

In addition, the wireless communications module 370 may further include an antenna. The wireless communications module 370 receives an electromagnetic wave through the antenna, performs frequency modulation and filtering processing on an electromagnetic wave signal, and sends a processed signal to the processor 310. The wireless communications module 370 may further receive a to-be-sent signal from the processor 310, perform frequency modulation and amplification on the signal, and convert the signal into an electromagnetic wave for radiation through the antenna.

In some embodiments, the wireless keyboard 300 may support wired charging. Specifically, the charging management module 340 may receive a charging input of a wired charger through the charging interface 330.

In some other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled to the wireless charging coil of the wireless charger to induce an alternating electromagnetic field emitted by the wireless charging coil 350 of the wireless charger and generate an alternating electrical signal. The alternating current signal generated by the wireless charging coil 350 is transmitted to the charging management module 340 through the matching circuit, so as to charge the battery 330 wirelessly.

The charging management module 340 may further supply power to the wireless keyboard 300 while charging the battery 330. The charging management module 340 receives an input of the battery 330, and supplies power to the processor 310, the memory 320, an external memory, the wireless communications module 370, and the like. The charging management module 340 may be further configured to monitor parameters such as a battery capacity, a battery cycle count, and a battery health status (such as leakage or impedance of the battery 360. In some other embodiments, the charging management module 340 may alternatively be disposed in the processor 310.

In some other embodiments, the wireless keyboard 300 may support reverse wireless charging. Specifically; the charging management module 340 may further receive an input of the charging interface 330 or the battery 360, and convert a direct electric signal that is input by the charging interface 330 or the battery 360 into an alternating electric signal. The alternating electric signal is transmitted to the wireless charging coil 350 through a matching circuit. The wireless charging coil 350 may generate an alternating electromagnetic field when receiving the alternating electric signal. A wireless charging coil of another mobile terminal induces the alternating electromagnetic field to perform wireless charging. To be specific, the wireless keyboard 300 may also wirelessly charge the another mobile terminal. In an embodiment, the wireless charging coil 350 may be disposed in the accommodating portion 303 of the wireless keyboard 300, and a wireless charging coil is disposed in the stylus rod 20 of the stylus 100. When the stylus 100 is placed in the accommodating portion 303, the wireless keyboard 300 may charge the stylus 100 through the wireless charging coil 350.

It should be noted that the matching circuit may be integrated into the charging management module 340, and the matching circuit may be independent of the charging management module 340. This is not limited in this embodiment of this application. FIG. 8 is a schematic diagram of a hardware structure of the wireless keyboard 300 by using an example in which the matching circuit may be integrated into the charging management module 340.

The charging interface 350 may be configured to provide a wired connection for charging or communication between the wireless keyboard. 300 and another electronic device for example, the wired charger of the wireless keyboard 300).

A touch sensor is integrated into the touch screen 380. A notebook computer may receive a user control command on the notebook computer through the touchpad 380 and the keyboard 390.

It may be understood that the structure shown in this embodiment of this application does not constitute a specific limitation on the wireless keyboard 300. The wireless keyboard may have more or fewer components than those shown in FIG. 8, may combine two or more components, or may have different component configurations. For example, a housing of the wireless keyboard 300 may also be provided with an accommodating portion for accommodating the stylus 100. The wireless charging coil 350 is disposed in the accommodating portion, and is configured to wirelessly charge the stylus 100 when the stylus 100 is accommodated in the accommodating portion.

For another example, the outer surface of the wireless keyboard 300 may further include components such as a key, an indicator (which may indicate a state such as a battery level, an incoming/outgoing call, and a pairing mode), and a display (which may prompt a user with related information). The key may be a physical key, a touch key (used in collaboration with the touch sensor), or the like, and is used to trigger an operation such as power-on, power-off, starting charging, or stopping charging.

Figure 9:
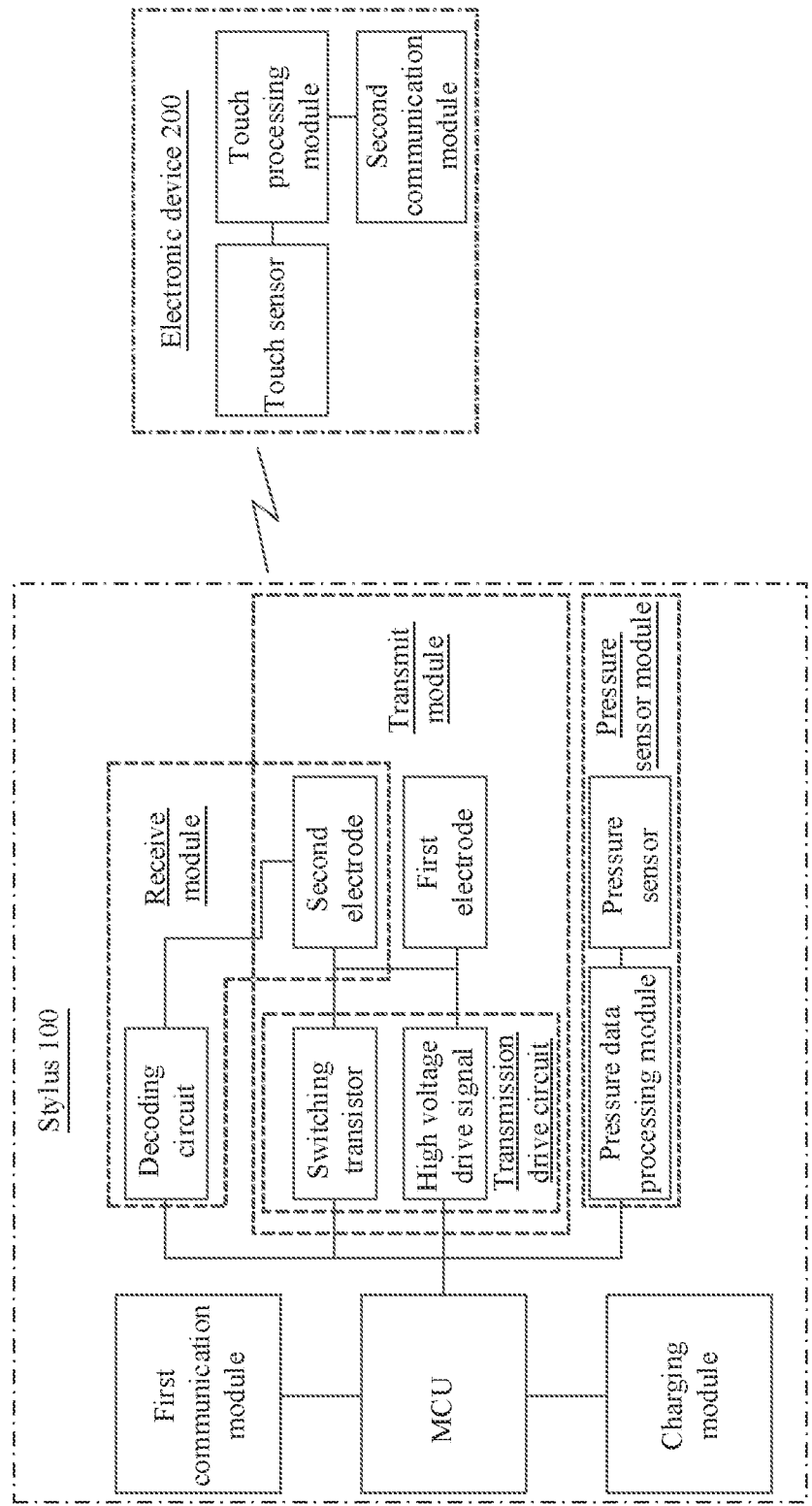
FIG. 9 is a schematic diagram showing interaction between a stylus and an electronic device according to an embodiment of this application.

FIG. 9 is a schematic diagram showing interaction between a stylus and an electronic device according to an embodiment of this application. Referring to FIG. 9, the stylus includes a micro controller unit (micro controller unit, MCU), a first communication module, a charging module, a pressure sensor module, a transmit (transport, TX) module, and a receive (receive, RX) module. The electronic device includes a touch sensor, a touch processing module, and a second communication module. It should be understood that the following embodiment is described by using an example in which both the first communication module and the second communication module are Bluetooth modules. The first communication module and the second communication module may also be wireless local area network modules. Wi-Fi modules, or the like, which is not limited in this embodiment of this application. It should be understood that the stylus and the electronic device may establish a wireless path by the first communication module and the second communication module to exchange wireless signals.

In the electronic device, the touch processing module is connected to the touch sensor and the second communication module. The touch sensor may include an electrode array. The touch sensor is configured to collect touch data, and the touch data may include data that the stylus touches a touch screen. The touch processing module is configured to determine a position of a stylus tip of the stylus and an included angle between the stylus and the touch screen (hereinafter referred to as an included angle) based on the touch data collected by the touch sensor. When the electronic device and the stylus establish the wireless path, that is, a wireless connection, the touch processing module may send an uplink signal through the electrode array, and the uplink signal is used for instructing the stylus to feed back a downlink signal. The touch processing module may determine the position of the stylus tip of the stylus and the included angle based on the downlink signal from the stylus. In an embodiment, the uplink signal may be a square wave signal, and the touch processing module may be a touch integrated circuit chip (integrated circuit chip).

In the stylus, the MCU is connected to the first communication module, the charging module, the pressure sensor module, the transmit module, and the receive module. It should be understood that the MCU may be understood as a processor shown in FIG. 6. The charging module is configured to charge the stylus. The pressure sensor module includes a pressure sensor and a pressure data processing module. The pressure sensor is connected to the pressure data processing module, and the pressure data processing module is connected to the MCU, The pressure sensor may be disposed at the stylus tip of the stylus, and the pressure sensor is configured to detect a pressure of the stylus tip. The data processing module is configured to collect pressure data from the pressure sensor, and send the pressure data to the MC U. In an embodiment, the MCU may send the pressure data to the electronic device based on the first communication module. The electronic device may receive the pressure data from the stylus based on the second communication module, and adjust, based on the pressure data, a thickness of a line written by the stylus on the touch screen.

The transmit module includes a first electrode, a second electrode, and a transmission drive circuit. Both the first electrode and the second electrode are connected to the transmission drive circuit, and the transmission drive circuit is connected to the MCU. The MCU is configured to generate a first pulse width modulation (pulse width modulation, PWM) signal and a second PWM signal, and sending the first PWM signal and the second PWM signal to a transmission drive circuit. The transmission drive circuit may drive the first electrode to send a first signal based on the first PWM signal, and drive the second electrode to send a second signal based on the second PWM signal, Both the first electrode and the second electrode may send signals. The first electrode may be referred to as TX1, and the second electrode may be referred to as TX2. In an embodiment, the first signal and the second signal may be referred to as downlink signals or coded signals. In an embodiment, the downlink signal may be a square wave signal. It should be understood that the uplink signal and the downlink signal in this embodiment of this application are from the perspective of the stylus. It is conceivable that from the perspective of the electronic device, the electronic device may send a downlink signal to the stylus, and the stylus may send an uplink signal to the electronic device based on the downlink signal. The following embodiment is described by using an example in which the stylus sends a downlink signal and the electronic device sends an uplink signal.

Referring to FIG. 9, in an embodiment, the transmission drive circuit may include a high voltage drive signal module and a switching transistor. The MCU is connected to a high voltage drive signal module and the switching transistor. The switching transistor is connected to the second electrode, and the high voltage drive signal module is connected to the first electrode and the second electrode. The high voltage drive signal module is configured to supply a high voltage drive signal, and drive the first electrode to send the first signal based on the first PWM signal from the MCU, and drive the second electrode to send the second signal based on the second PWM signal from the MCU.

In an embodiment, the MCU is further configured to control the switching transistor to implement switching of the second electrode between signal transmitting and signal receiving, that is, to implement switching of the second electrode between TX2 and RX. A specific circuit of the switching transistor and a control mode of the MCU are not described in detail in this embodiment of this application. That is, the MCU may control the switching transistor to use the second electrode as TX2, and the second electrode used as the TX2 is connected to the transmission drive circuit, so that the second electrode can transmit the second signal. The MCU may also control the switching transistor to use the second electrode as RX, and the second electrode used as the RX is connected to the receiving module, so that the second electrode can receive the uplink signal from the electronic device. In other words, the second electrode can be switched between TX2 and RX under the control of MCU.

The receive module includes a decoding circuit. The decoding circuit may be connected to the switching transistor, and the decoding circuit may also be connected to the Maj. The second electrode is configured to receive the uplink signal from the electronic device and send the uplink signal to the decoding circuit. The decoding circuit is configured to decode the uplink signal and send a decoded uplink signal to the MCU.

Figure 10:
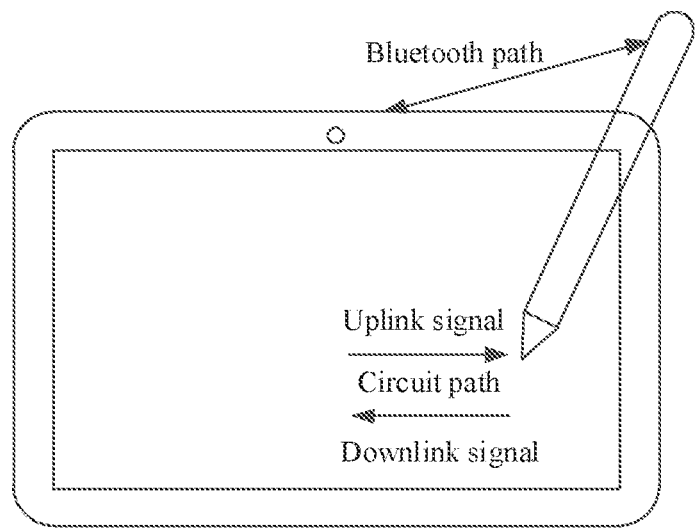
FIG. 10 is a schematic diagram of another scenario to which an embodiment of this application is applicable.

Based on the structure shown in FIG. 9, a process of interaction between the electronic device and the stylus will be described below in connection with FIG. 10. FIG. 10 is a schematic diagram of a scenario to which an embodiment of this application is applicable. Referring to FIG. 10, for example, the stylus and the electronic device may establish a Bluetooth connection, and a wireless path between the stylus and the electronic device may be referred to as a Bluetooth path. Because electrodes are disposed at the stylus tip of the stylus, the touch sensor in the electronic device includes the electrode array. An insulating substance (such as air or glass on a touch screen) is present between the stylus tip of the stylus and the electrodes of the touch sensor, which is thus equivalent to that a capacitor is present between the stylus tip of the stylus and the electrodes of the touch sensor. A circuit connection may be established between the stylus tip of the stylus and the touch sensor in the electronic device through the capacitor. In the following embodiment, a path between the stylus tip of the stylus and the touch sensor in the electronic device is referred to as a circuit path.

In an embodiment, when a Bluetooth connection is successfully established between the electronic device and the stylus, the touch processing module may control the touch sensor to send an uplink signal through the circuit path. In an embodiment, when a Bluetooth connection is successfully established between the electronic device and the stylus, and the electronic device detects that the stylus is not charged, the touch processing module may control the touch sensor to send an uplink signal through the circuit path. In an embodiment, when a Bluetooth connection is successfully established between the electronic device and the stylus, and the electronic device detects that the stylus is in a moving state, the touch processing module may control the touch sensor to send an uplink signal through the circuit path. It should be understood that triggering conditions for sending uplink signals by the different electronic devices may be different, and the following embodiment is described by using an example "when a Bluetooth connection is successfully established between the electronic device and the stylus, the touch processing module controls the touch sensor to send the uplink signal through the circuit path".

The second electrode may be configured to receive the uplink signal from the electronic device based on the circuit path, and send the uplink signal to the decoding circuit. The decoding circuit may transmit a decoded uplink signal to the MCU. The MCU, based on the decoded uplink signal, controls the transmission drive circuit to drive the first electrode to send a first signal, and to drive the second electrode to send a second signal. That is, the stylus may send a downlink signal through the circuit path. The touch sensor in the electronic device may receive the downlink signal based on the circuit path. The touch processing module may obtain the position of the stylus tip of the stylus and the included angle based on the downlink signal collected by the touch sensor.

Figure 11A:
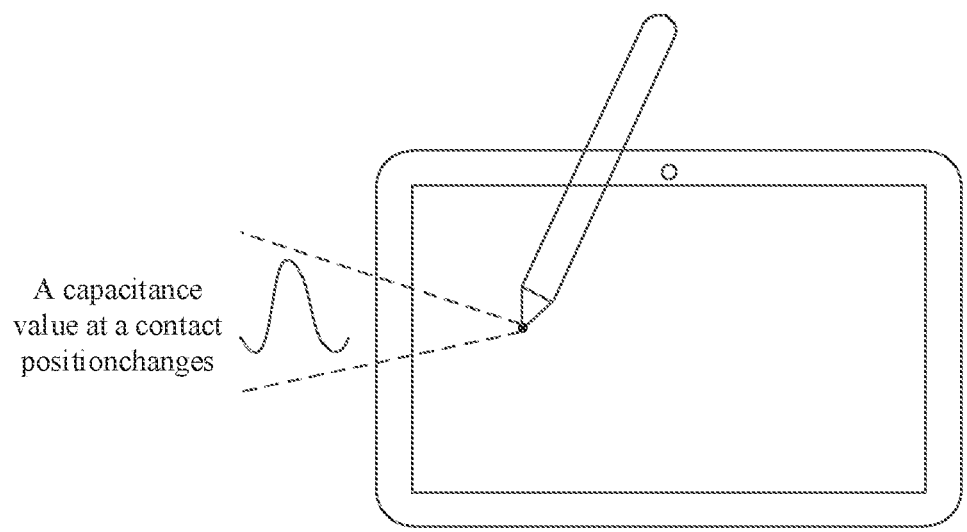
FIG. 11A is a schematic diagram showing a change in a capacitance value of a touch screen.
Figure 11B:
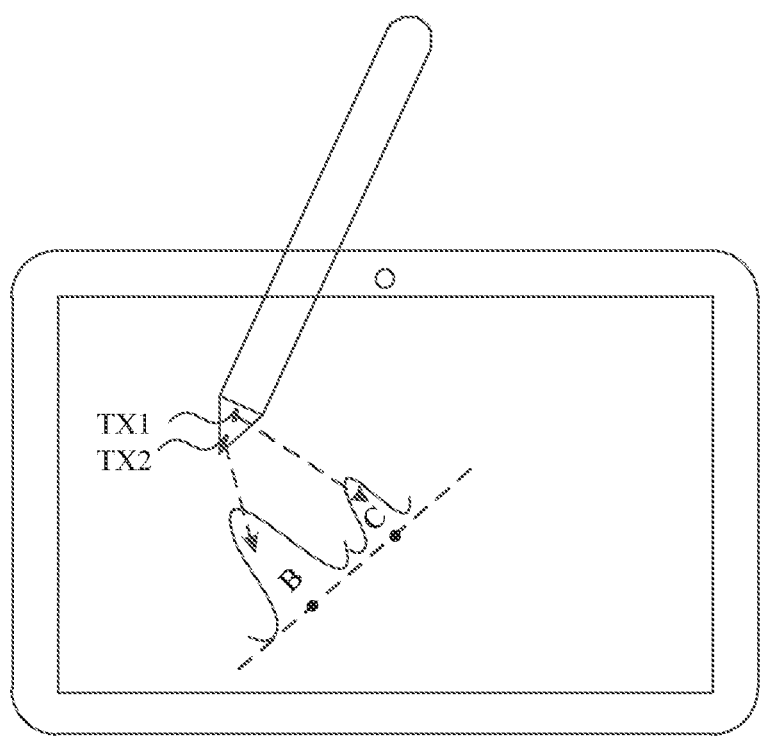
FIG. 11B is another schematic diagram showing a change in capacitance value of a touch screen.

FIG. 11A is a schematic diagram showing a change in a capacitance value of the touch screen. When the touch sensor receives the first signal from the first electrode of the stylus, a capacitance value at a corresponding position of the touch screen changes. Referring to FIG. 11A, in FIG. 11A, the generation of a peak of the capacitance value represents a change in the capacitance value at the corresponding position of the touch screen, and the electronic device may determine a position of the stylus tip of the stylus based on the change in the capacitance value on the touch screen. In addition, the electronic device may obtain an included angle by using a dual-tip projection method in an inclination angle detection algorithm. Referring to FIG. 11B, the first electrode and the second electrode in the stylus may be disposed at the stylus tip of the stylus, where the first electrode is disposed near the end of the stylus tip, and the second electrode is disposed away from the end of the stylus tip with respect to the first electrode. When the touch sensor receives the first signal from the first electrode of the stylus and the second signal from the second electrode, the capacitance values at two positions (such as a position B and a position C) of the touch screen change, and the electronic device may obtain an included angle based on a distance between the first electrode and the second electrode and a distance between the two positions of the touch screen. For more details about the dual-tip projection method, reference may be made to related descriptions of the conventional technology. FIG. 11A shows a position at which the stylus is in contact with the touch screen by using a black dot, and FIG. 11B shows the position B and the position C by using black dots.

To facilitate the description of the signal synchronization method provided in this application, the terms used in this embodiment of this application are explained as follows:

A refresh rate of an electronic device: the quantity of refreshes per second of a picture displayed by the electronic device. The refresh rate of the electronic device may also be referred to as a display frequency or a display frame rate. The refresh rate of the electronic device may be, but is not limited to, 60 Hz, 90 Hz, and 120 Hz. For example, the refresh rate of the electronic device is 60 Hz, representing that the electronic device refreshes the picture displayed by the touch screen every 16.6 ms (1000 ms/60).

The electronic device sends an uplink signal at the refresh rate of 60 Hz, representing that the electronic device sends the uplink signal to the stylus every 16.6 ms.

A period of the uplink signal, representing a duration between two uplink signals sent by the electronic device. If the refresh rate of the electronic device is 60 Hz, the period of the uplink signal is 16.6 ms.

The electronic device samples a downlink signal based on the refresh rate: the electronic device samples N downlink signals within the period of one uplink signal based on the refresh rate of the electronic device. For example, the refresh rate of the electronic device is 60 Hz, and the electronic device samples the downlink signals based on 60 Hz, representing that the electronic device samples N downlink signals from the stylus within 16.6 ms after sending the uplink signal to the stylus. N is an integer greater than or equal to 1, and N may be predetermined, for example, N is 3.

A stylus sends a downlink signal based on the refresh rate: the stylus sends N downlink signals within the period of one uplink signal based on the refresh rate of the electronic device. For example, the refresh rate of the electronic device is 60 Hz, and the stylus sends the downlink signal based on 60 Hz, representing that the stylus sends N downlink signals to the electronic device within 16.6 ms after receiving the uplink signal from the electronic device.

The signal of the electronic device is synchronized with that of the stylus: the electronic device may sample every downlink signal from the stylus, and may obtain the position of the stylus and the included angle once based on each downlink signal.

Figure 12:
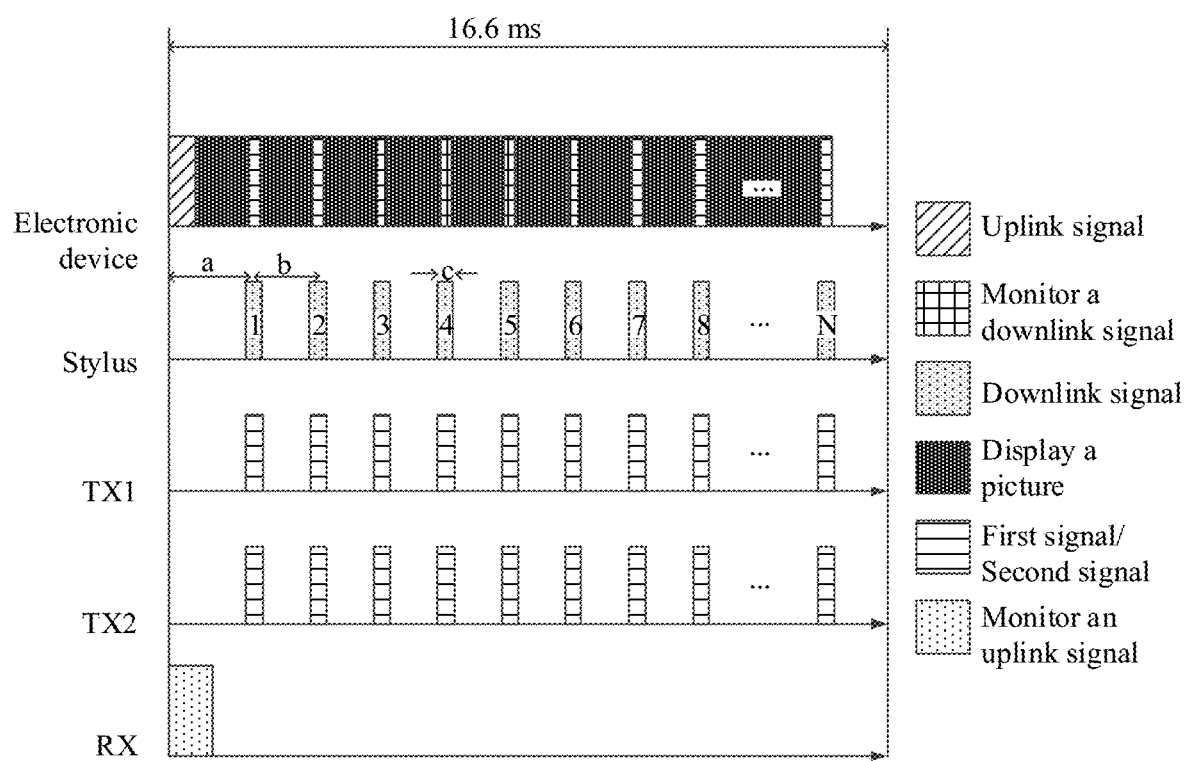
FIG. 12 is a signal timing diagram according to an embodiment of this application.

FIG. 12 is a signal timing diagram according to an embodiment of this application. FIG. 12 is the signal timing diagram showing signal synchronization between the electronic device and the stylus. FIG. 12 shows the timing at which the electronic device sends an uplink signal and samples a downlink signal from the stylus, and also shows the timing at which the stylus sends the downlink signal, the timing at which the TX1 in the stylus sends a first signal and the TX2 in the stylus sends a second signal, and the timing at which the RX receives (or samples or monitors) the uplink signal. Referring to FIG. 12, for example, the refresh rate of the electronic device is 60 Hz, the electronic device samples the downlink signal based on 60 Hz, and the stylus sends the downlink signal based on 60 Hz. After the electronic device is in Bluetooth connection with the stylus, the electronic device may send one uplink signal to the stylus every 16.6 ms. Correspondingly, the stylus (RX) may receive the uplink signal from the electronic device every 16.6 ins. FIG. 12 is described by using an example of any uplink signal in an interaction process between the electronic device and the stylus. When receiving the uplink signal from the electronic device, the stylus may send N downlink signals within 16.6 ms. The TX1 may send N first signals within 16.6 ms, and the TX2 may send N second signals within 16.6 ms. Correspondingly, after sending the uplink signal, the electronic device may sample N downlink signals from the stylus within 16.6 ms. In FIG. 12, the stylus may send the downlink signal based on the refresh rate of the electronic device, so that the electronic device may sample N downlink signals from the stylus within 16.6 ms after sending the uplink signal, and the electronic device may obtain a position of the stylus tip of the stylus and an included angle based on the downlink signal sampled each time. The time between the electronic device sending the uplink signal and sampling the downlink signals from the stylus, is used for displaying a picture.

In an embodiment, referring to FIG. 12, the stylus and the electronic device may store a configuration file, where the configuration file includes values of a, b, c, and N, where a indicates a duration between the stylus receiving an uplink signal from the electronic device and sending a first downlink signal, b indicates a duration between two adjacent downlink signals sent by the stylus, c indicates a duration occupied by one downlink signal, and N indicates the quantity of downlink signals sent by the stylus between the two adjacent uplink signals. a, b, c, and N may be predetermined, that is, the electronic device may determine a strategy for sampling the downlink signals after sending the uplink signal based on preconfigured a, b, c, and N. For example, the electronic device samples N downlink signals according to a, b, c within the period of one uplink signal. Similarly, the stylus may determine a strategy for sending the downlink signal based on preconfigured a, b, c, and N. For example, after receiving an uplink signal from the electronic device, the stylus may send N downlink signals according to a, b, and c based on the refresh rate of the electronic device.

It should be understood that in this embodiment of this application "the electronic device samples N downlink signals from the stylus within a ms after sending an uplink signal" may be understood as: within a period of a ms of an uplink signal, the electronic device samples a downlink signal from the stylus for the first time within a ms after sending the uplink signal, and then samples the downlink signal from the stylus every b ins, where N downlink signals are sampled in total, and each sampling duration is c ms. Similarly, "the stylus sends N downlink signals within a period of a ms of an uplink signal" represents: after receiving an uplink signal from the electronic device, the stylus sends a first downlink signal after a ms, and then sends the downlink signal every b ms, where N downlink signals are sent in total, and the duration occupied by each downlink signal is c ins. In this way, the electronic device can keep signal synchronization with the stylus. When the refresh rate is 60 Hz, a is 16.6 ms; or when the refresh rate is 90 Hz, a is 11.1 ms. It should be understood that when the refresh rates are different, a, b, and c are different. It may be understood that a at the refresh rate of 60 Hz is different from a at the refresh rate of 90 Hz, h at the refresh rate of 60 Hz is different from b at the refresh rate of 90 Hz, and c at the refresh rate of 60 Hz is different from c at the refresh rate of 90 Hz, That is, when the refresh rates are different, and a, b and c in the configuration file are different. In an embodiment, a, b, c, and N may all be different when the refresh rates are different.

Figure 13:
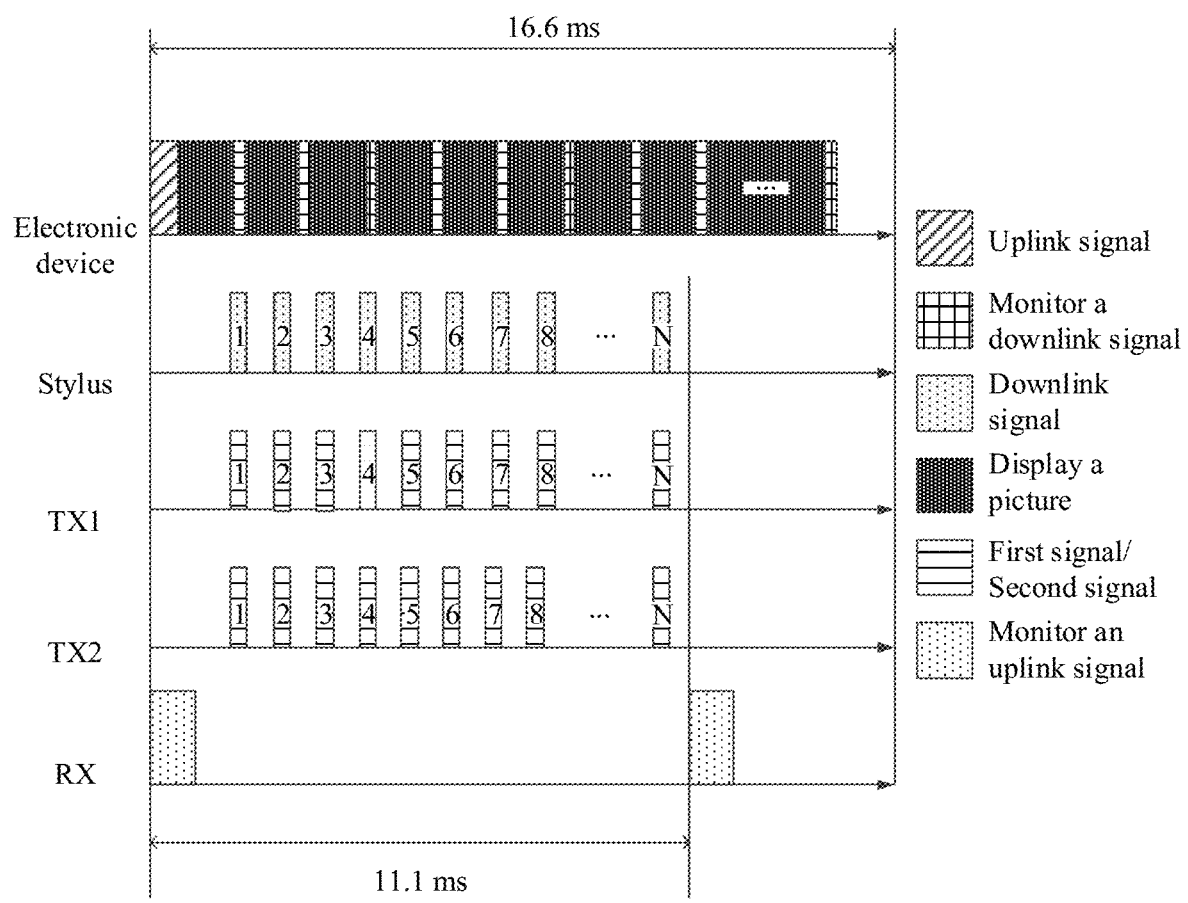
FIG. 13 is another signal timing diagram according to an embodiment of this application.

FIG. 13 is another signal timing diagram according to an embodiment of this application. It should be understood that FIG. 13 is a timing diagram showing signal out of synchronization between the electronic device and the stylus. Referring to FIG. 13, for example, when the refresh rate of the electronic device is switched from 60 Hz to 90 Hz, the electronic device samples a downlink signal based on 90 Hz, the stylus fails to obtain in a timely manner the refresh rate of the electronic device after switching, and the stylus still send the downlink signal based on 60 Hz. Referring to FIG. 13, the electronic device sends an uplink signal ever 11.1 ms. The electronic device samples N downlink signals from the stylus within 11.1 ms after sending the uplink signal. Because the stylus sends the downlink signal based on 60 Hz, and the stylus sends N downlink signals within 16.6 ms after receiving the uplink signal from the electronic device, sampling of the downlink signals by the electronic device is not synchronized with sending of the downlink signals by the stylus, and thus the electronic device cannot sample the downlink signal from the stylus. Therefore, the electronic device cannot detect a position of the stylus tip of the stylus and an included angle, that is, signal synchronization between the electronic device and the stylus fails, resulting in a problem that the stylus cannot write.

After the electronic device is in Bluetooth connection with the stylus, the electronic device may switch the refresh rate based on different application scenarios. For example, the electronic device may use the refresh rate of 90 Hz in a scenario with a high demand for picture fluency, such as a game or a video, to meet the user demand for picture fluency. The electronic device may use the refresh rate of 60 Hz in a scenario with a low demand for picture fluency, such as a call, and thus power consumption of the electronic device may be reduced. When the electronic device switches the refresh rate, the stylus cannot detect switching of the refresh rate of the electronic device in a timely manner, and thus cannot adjust the refresh rate in a timely manner to achieve signal synchronization with the electronic device, resulting in the problem that the stylus cannot write as shown in FIG. 13 above.

Figure 14:
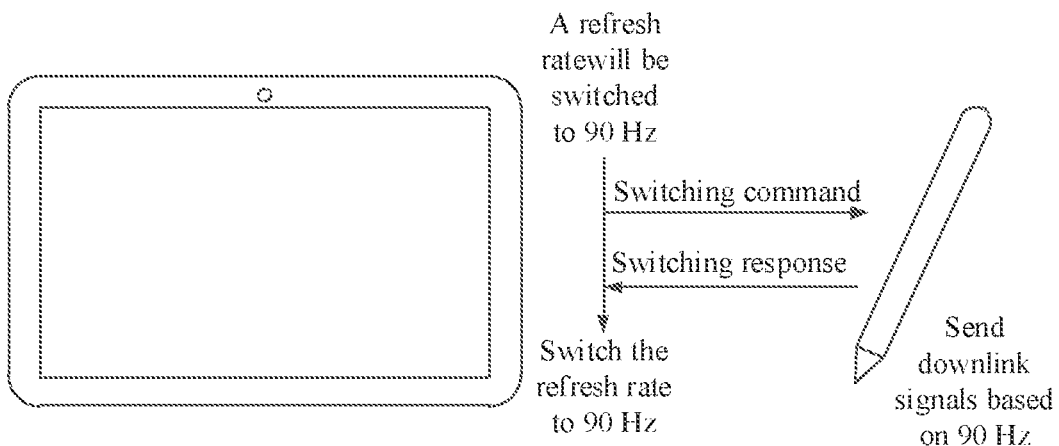
FIG. 14 is a schematic diagram showing adjusting of a refresh rate by a stylus according to an embodiment of this application.

In an embodiment, to solve the problem that the stylus cannot detect in a timely manner when the electronic device switches the refresh rate, referring to FIG. 14, the electronic device may send a switching command to the stylus before switching to a second refresh rate, where the switching command is used for indicating that the electronic device will be switched to the second refresh rate, and instructing the stylus to synchronously adjust a frequency of sending a downlink signal. When receiving the switching command, the stylus may send the downlink signal based on the refresh rate of the electronic device after switching. After adjusting the frequency of sending the downlink signal, the stylus may feed back a switching response to the electronic device to inform the electronic device that the stylus has been adjusted. Upon receiving the switching response, the electronic device may switch to the second refresh rate. In this manner, the electronic device may inform the stylus when switching the refresh rate, so that the stylus obtains the refresh rate of the electronic device after switching. However, this command interaction manner has a large time delay and requires multiple signaling interactions.

An embodiment of this application provides a signal synchronization method. When an electronic device is wirelessly connected to a stylus, the stylus may monitor an uplink signal from the electronic device by using the least common multiple of all refresh rates supported by the electronic device based on the all refresh rates supported by the electronic device, and can detect in a timely manner whether the electronic device switches the refresh rate. In this embodiment of this application, when switching the refresh rate, the electronic device does not need to perform signaling interaction with the stylus, the stylus can detect a change in the refresh rate of the electronic device without performing signaling interaction with the electronic device, thereby achieving a small time delay and high efficiency.

The signal synchronization method provided in this embodiment of this application will be described below with reference to specific embodiments. The following several embodiments may be mutually combined, and same or similar concepts or processes may not be repeatedly described in some embodiments.

Figure 15:
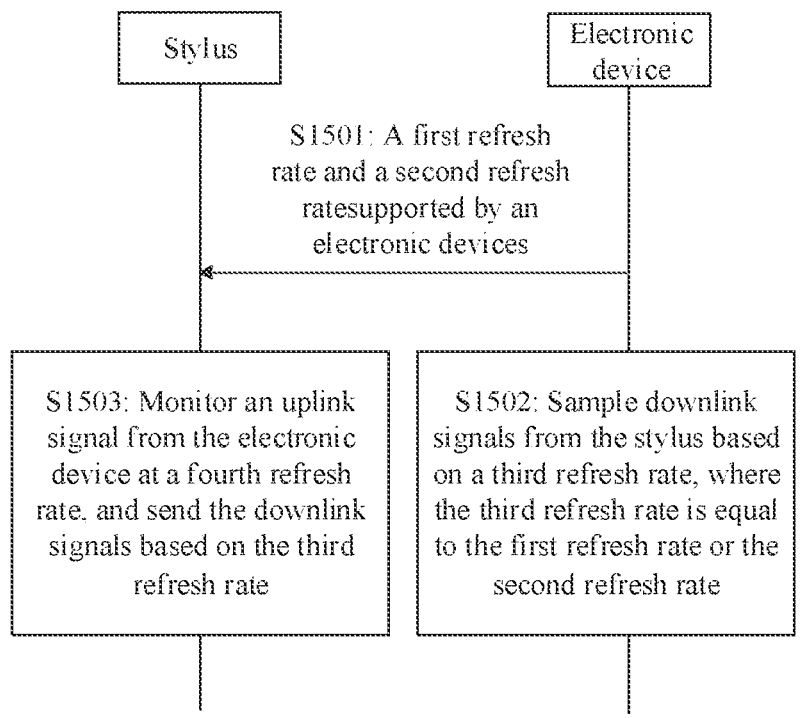
FIG. 15 is a schematic flowchart of an embodiment of a signal synchronization method according to an embodiment of this application.

FIG. 15 is a schematic flowchart of an embodiment of a signal synchronization method according to an embodiment of this application. As shown in FIG. 15, the method may include:

S1501: A stylus obtains a first refresh rate and a second refresh rate supported by an electronic device.

The first refresh rate and the second refresh rate each may represent a plurality of refresh rates. For example, the first refresh rate may be a refresh rate less than 100 Hz, for example, 60 Hz or 90 Hz. The second refresh rate may be a refresh rate greater than 100 Hz, for example, 120 Hz or 150 Hz. The following description is based on an example in which the first refresh rate and the second refresh rate each represent a value, for example, the first refresh rate is 60 Hz, and the second refresh rate is 90 Hz.

In an embodiment, the stylus may obtain the first refresh rate and the second refresh rate supported by the electronic device during a wireless connection with the electronic device. During the wireless connection, the electronic device may send the first refresh rate and the second refresh rate to the stylus by carrying the first refresh rate and the second refresh rate in any signaling. For example, the electronic device may send a connection request to the stylus based on an MAC address of the stylus, where the connection request may carry the first refresh rate and the second refresh rate.

In an embodiment, after the electronic device is wirelessly connected to the stylus, and before the electronic device sends an uplink signal to the stylus, the electronic device may send the first refresh rate and the second refresh rate supported by the electronic device to the stylus. For example, the electronic device may send the first refresh rate and the second refresh rate supported by the electronic device to the stylus by using a Bluetooth signal. FIG. 15 is described by using an example in which an electronic device sends the first refresh rate and the second refresh rate supported by the electrical device to the stylus.

In an embodiment, the stylus may store the first refresh rate and the second refresh rate supported by the electronic device. For example, during a manufacturing stage of the stylus, the first refresh rate and the second refresh rate supported by the electronic device may be written into the stylus, or when the stylus is wirelessly connected to the electronic device for the first time, the stylus obtains the first refresh rate and the second refresh rate supported by the electronic device, and has stored the first refresh rate and the second refresh rate.

S1502: After the electronic device is wirelessly connected to the stylus, the electronic device samples a downlink signal from the stylus based on a third refresh rate, where the third refresh rate is equal to the first refresh rate or the second refresh rate.

In this embodiment of this application, the electronic device may send an uplink signal to the stylus at the first refresh rate or the second refresh rate. The electronic device may sample the downlink signal from the stylus based on the third refresh rate, where the third refresh rate is equal to the first refresh rate or the second refresh rate. It should be noted that the third refresh rate is greater than or equal to the refresh rate at which the electronic device sends the uplink signal to the stylus, to ensure that the electronic device can complete sampling of the downlink signal during a period of the uplink signal. For example, the electronic device may send the uplink signal to the stylus at 60 Hz, and sample the downlink signal from the stylus based on 60 Hz. Alternatively, the electronic device may send the uplink signal to the stylus at 60 Hz, and sample the downlink signal from the stylus based on 90 Hz. Alternatively, the electronic device may send the uplink signal to the stylus at 90 Hz, and sample the downlink signal from the stylus based on 90 Hz.

S1503: The stylus monitors an uplink signal from the electronic device at a fourth refresh rate, and sends the downlink signal based on the third refresh rate.

The fourth refresh rate is the least common multiple of "the first refresh rate and the second refresh rate", After obtaining the first refresh rate and the second refresh rate, the stylus may calculate the least common multiple of the first refresh rate and the second refresh rate, that is the fourth refresh rate, and monitor the uplink signal from the electronic device at the fourth refresh rate. For example, the refresh rates supported by the electronic device are 60 Hz and 90 Hz, and the least common multiple of 60 Hz and 90 Hz is 180 Hz, and therefore, the fourth refresh rate is 180 Hz. In this embodiment of this application, to avoid the problem that the stylus cannot detect in a timely manner when the electronic device switches the refresh rate, the stylus may monitor the uplink signal from the electronic device at the fourth refresh rate after being wirelessly connected to the electronic device, and then may obtain the refresh rate of the electronic device in a timely manner to determine whether the electronic device switches the refresh rate.

The stylus may determine whether the electronic device switches the refresh rate based on a duration between the two adjacent uplink signals that are monitored. If the duration between the two adjacent uplink signals changes, it is determined that the electronic device switches the refresh rate; or if the duration between the two adjacent uplink signals does not change, it is determined that the electronic device does not switch the refresh rate. For example, if the duration between the two adjacent uplink signals changes from 16.6 ms to 11.1 ms, the stylus may determine that the refresh rate of the electronic device is switched from 60 Hz to 90 Hz. In an embodiment, the duration between the two adjacent uplink signals may be referred to as a period of the uplink signal.

In this embodiment of this application, the electronic device samples the downlink signal from the stylus based on the third refresh rate, and the stylus sends the downlink signal based on the third refresh rate, so that the electronic device may sample the downlink signal from the stylus, and then signal synchronization between the electronic device and the stylus is kept.

In this embodiment of this application, when the electronic device is wirelessly connected to the stylus, the stylus may monitor the uplink signal from the electronic device by using the least common multiple of all the refresh rates supported by the electronic device, so that whether the electronic device switches the refresh rate may be detected in a timely manner without missing the uplink signal. Compared with the conventional technology, the stylus may detect the refresh rate of the electronic device in a timely manner without performing signaling interaction with the electronic device, thereby achieving a small time delay and high efficiency.

In an embodiment, the third refresh rate is equal to the first refresh rate. That is, the electronic device may send the uplink signal to the stylus at the first refresh rate, and sample the downlink signal from the stylus based on the first refresh rate; and the stylus monitors the uplink signal from the electronic device at the fourth refresh rate, and sends the downlink signal based on the first refresh rate. For example, the first refresh rate is 60 Hz, and the second refresh rate is 90 Hz. The electronic device sends the uplink signal at 60 Hz, that is, the electronic device sends the uplink signal to the stylus every 16.6 ins. In this application, to detect the change in the refresh rate of the electronic device in a timely manner, the stylus may monitor the uplink signal by using 180 Hz, that is, the stylus may monitor the uplink signal from the electronic device every 5.5 ms (1000 ms/180).

In this embodiment of this application, a frequency at which the stylus monitors the uplink signal is higher than a frequency at which the electronic device sends the uplink signal, and a frequency at which the stylus monitors the uplink signal is a multiple of the frequency al which the electronic device sends the uplink signal. Therefore, the stylus may monitor every uplink signal from the electronic device. The stylus sends a downlink signal based on 60 Hz, that is, the stylus may send N downlink signals within 16.6 Ins after receiving the uplink signal from the electronic device. The electronic device monitors the downlink signal based on 60 Hz, that is, the electronic device samples N downlink signals from the stylus within 16.6 ms after sending the uplink signal. The electronic device may receive the downlink signal from the stylus, and signal synchronization between the electronic device and the stylus may be kept.

In this embodiment of this application, the stylus monitors the uplink signal from the electronic device by using the fourth refresh rate, and the stylus can still monitor the uplink signal from the electronic device even if the refresh rate of the electronic device changes. The stylus may determine the refresh rate of the electronic device based on the period of the uplink signal that is received. When the stylus determines that the refresh rate of the electronic device is switched from the first refresh rate to the second refresh rate, the stylus may send the downlink signal based on the second refresh rate, thereby ensuring signal synchronization between the stylus and the electronic device. To ensure signal synchronization between the stylus and the electronic device, the stylus may continue to monitor the uplink signal from the electronic device at the fourth refresh rate. It should be understood that switching of the refresh rate of the electronic device from the first refresh rate to the second refresh rate may be understood as: before switching of the refresh rate, the electronic device sends the uplink signal at the first refresh rate and samples the downlink signal based on the first refresh rate; and after switching of the refresh rate, the electronic device sends the uplink signal at the second refresh rate and samples the downlink signal based on the second refresh rate.

Figure 16:
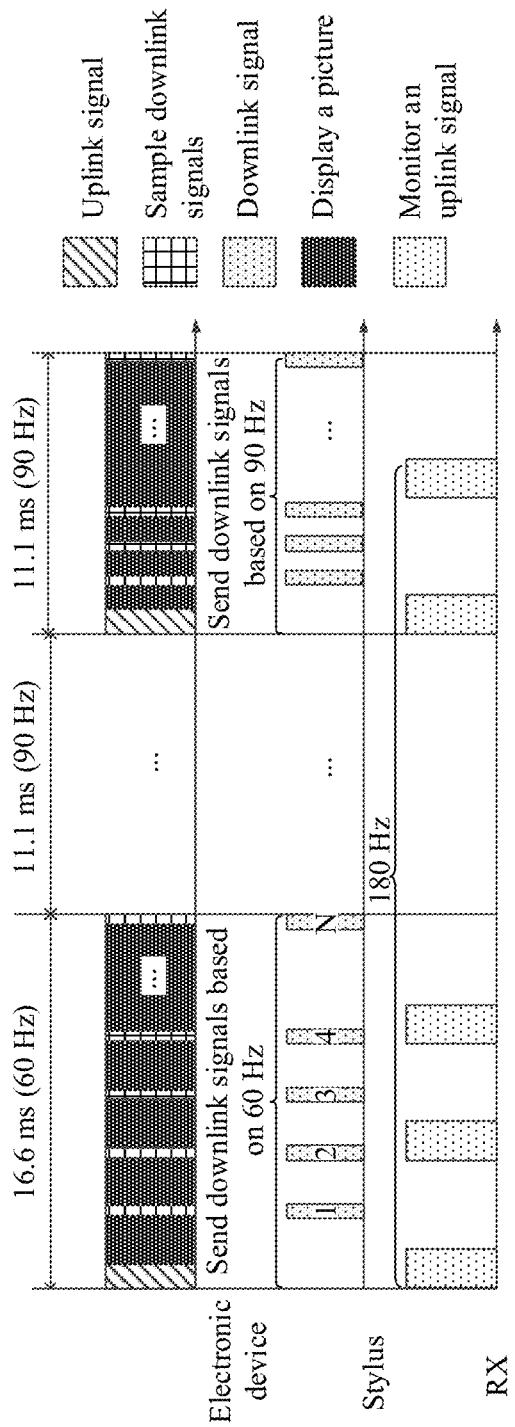
FIG. 16 is another signal timing diagram according to an embodiment of this application.

FIG. 16 is another signal timing diagram according to an embodiment of this application. Referring to FIG. 16, the stylus monitors an uplink signal from the electronic device by using 180 Hz. At time t1, a the stylus determines that a period of the uplink signal changes from 16.6 ms to 11.1 ms, and then the stylus determines that the refresh rate of the electronic device changes from 60 Hz to 90 Hz. At time t1, the stylus may send a downlink signal based on the refresh rate of 90 Hz. For example, the stylus may send N downlink signals within 11.1 ms after receiving the uplink signal, and the refresh rate of the electronic device is switched from 60 Hz to 90 Hz, so that the electronic device may sample N downlink signals based on 90 Hz within 11.1 ms after sending the uplink signal, and thus the signals of the electronic device and the stylus are synchronized.

In an embodiment, the third refresh rate is equal to the second refresh rate, that is, the electronic device sends the uplink signal to the stylus at the second refresh rate and samples the downlink signal from the stylus based on the second refresh rate, and the stylus monitors the uplink signal from the electronic device at the fourth refresh rate and sends the downlink signal based on the second refresh rate. In this embodiment, when the stylus detects that the refresh rate of the electronic device is switched from the second refresh rate to the first refresh rate, the downlink signal may be sent based on the first refresh rate, and reference may be made to the foregoing related description "the third refresh rate is equal to the first refresh rate".

In this embodiment of this application, after the stylus is wirelessly connected to the electronic device, the stylus may obtain the first refresh rate and the second refresh rate supported by the electronic device, and monitor the uplink signal from the electronic device based on the least common multiple of the first refresh rate and the second refresh rate. The stylus may detect whether the refresh rate of the electronic device changes based on the period of the uplink signal. If it is detected that the refresh rate of the electronic device is switched from the first refresh rate to the second refresh rate, the stylus may send the downlink signal based on the second refresh rate, thereby ensuring signal synchronization with the electronic device.

Figure 17:
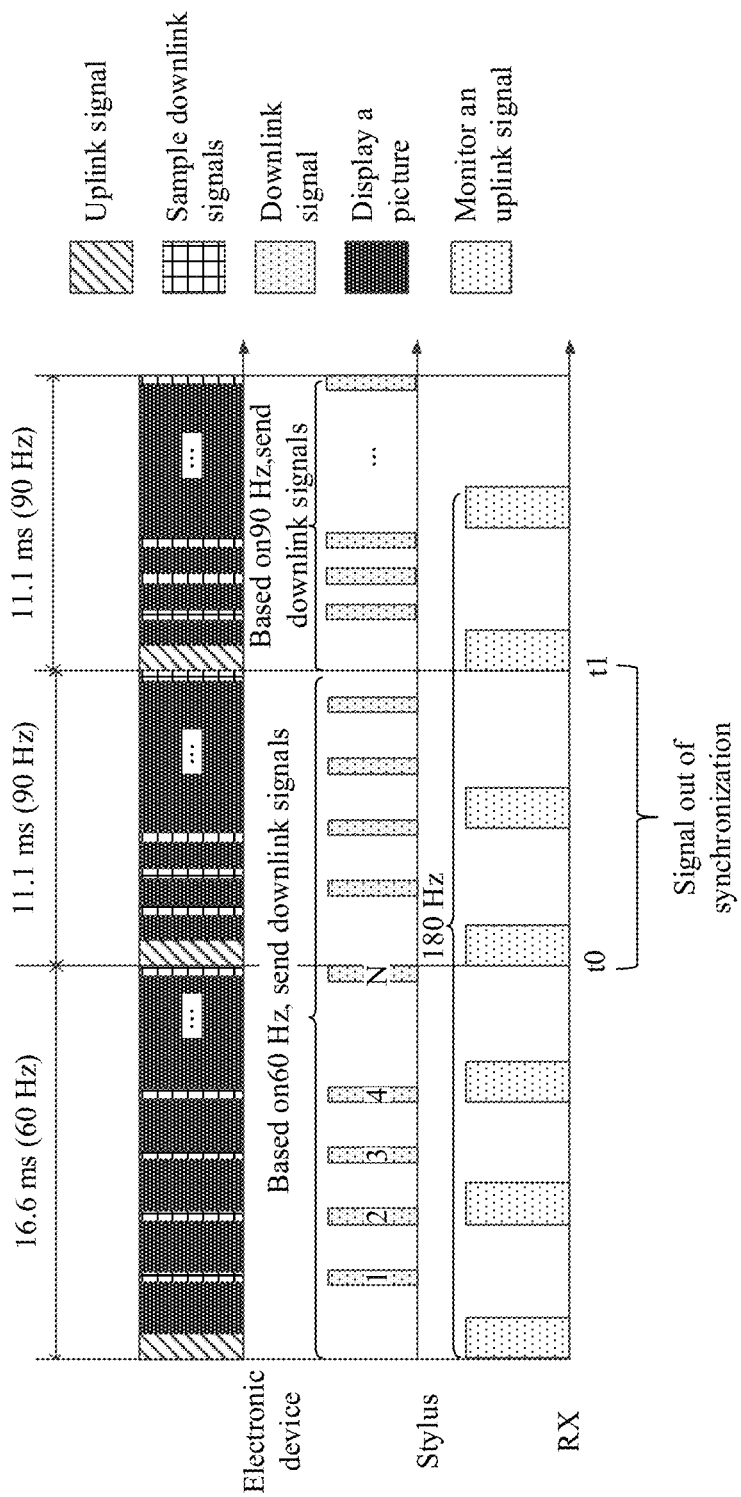
FIG. 17 is another signal timing diagram according to an embodiment of this application.

In the foregoing embodiment, the stylus may determine whether the refresh rate of the electronic device changes based on the period of the uplink signal, that is, the duration between the two adjacent uplink signals that are received. In this embodiment, the stylus can determine whether the refresh rate of the electronic device changes only when monitoring a subsequent uplink signal. Referring to FIG. 17, at time t1, the stylus determines that the duration between the two adjacent uplink signals that are received changes from 16.6 ms to 11.1 ms, indicating that at time t0 before time t1, the refresh rate of the electronic device has been switched from 60 Hz to 90 Hz, and then a duration between time to and time t1 is 11.1 ms. However, between time t0 and time t1, the stylus still sends the downlink signal based on 60 Hz, while the electronic, device samples the downlink signal based on 90 Hz. Therefore, between time t0 and time t1, the signals of the stylus and the electronic device are not synchronized, that is, the electronic device cannot receive the downlink signal from the stylus from time t0 to time t1, resulting in a problem that the stylus has intermittent handwriting.

To keep signal synchronization between the stylus and the electronic device from time t0 to time t1, after the stylus is wirelessly connected to the electronic device, the stylus may send the downlink signal based on the maximum refresh rate supported by the electronic device. To ensure that the electronic device can synchronously receive the downlink signal from the stylus, the electronic device may sample the downlink signal from the stylus based on the maximum refresh rate supported by the electronic device, thereby ensuring that the signals of the stylus and the electronic device are still synchronized from time t0 to time t1 when the electronic device switches the refresh rate, and achieving the purpose of real-time signal synchronization between the electronic device and the stylus. For details, refer to the following description.

In this embodiment of this application, S1502 may be replaced by: The electronic device sends an uplink signal to the stylus at the first refresh rate or the second refresh rate, and samples a downlink signal from the stylus based on a third refresh rate, where the third refresh rate is the maximum refresh rate supported by the electronic device. Alternatively, the S1502 may be replaced by: The electronic device sending an uplink signal to the stylus at the first refresh rate or the second refresh rate, and samples a downlink signal from the stylus based on a third refresh rate, where the third refresh rate is equal to the second refresh rate, and the second refresh rate is greater than the first refresh rate. For example, if the refresh rates supported by the electronic device are 60 Hz and 90 Hz, the maximum refresh rate supported by the electronic device is 90 Hz, that is, the third refresh rate is 90 Hz.

In this embodiment of this application, the stylus sends the downlink signal at the maximum refresh rate supported by the electronic device, instead of sending the downlink signal at the minimum refresh rate supported by the electronic device or the other refresh rate supported by the electronic device, because the stylus can send N downlink signals within the shortest time based on the maximum refresh rate supported by the electronic device. If the stylus sends the downlink signal based on the minimum refresh rate supported by the electronic device, the stylus may receive the uplink signal from the electronic device before the downlink signal is completely sent, causing the uplink and downlink signals to be confused.

Figure 18:
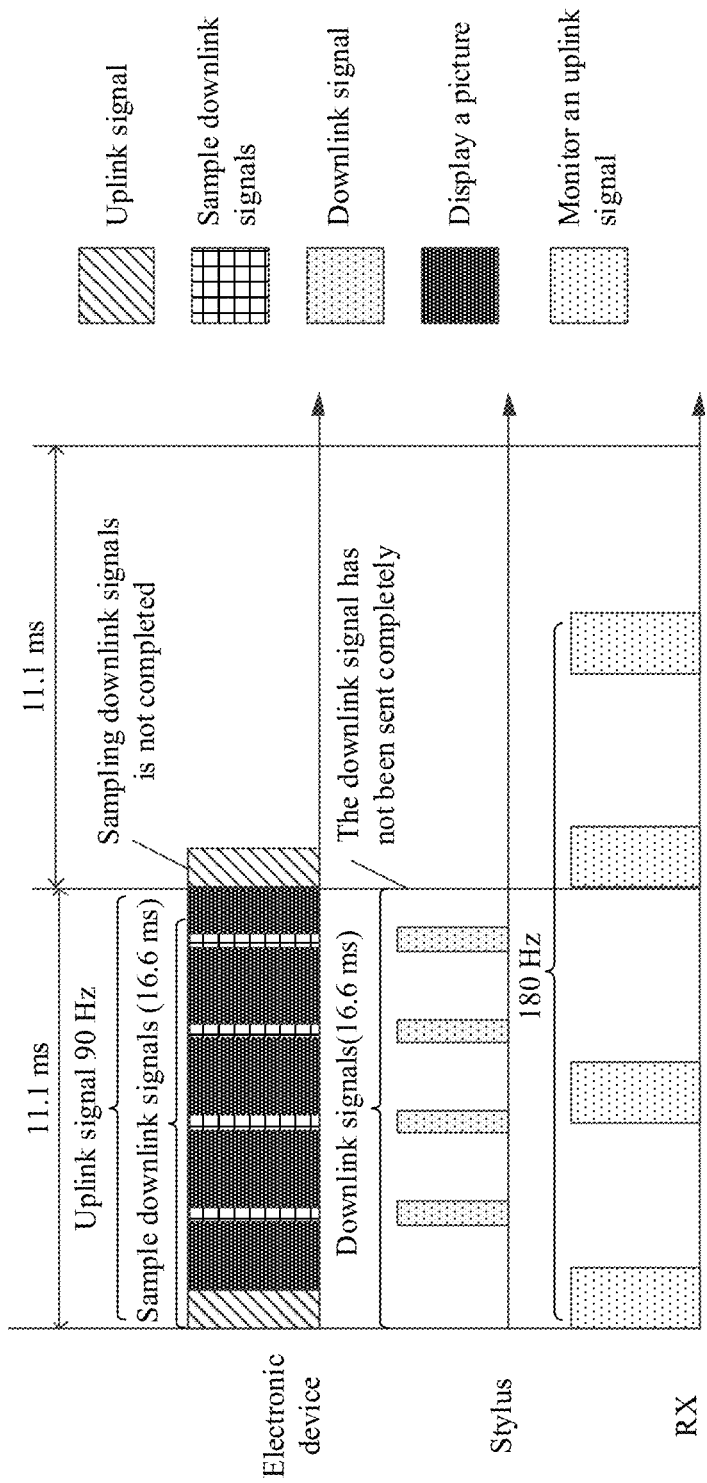
FIG. 18 is another signal tutting diagram according to an embodiment of this application.

For example, referring to FIG. 18, the electronic device sends the uplink signal at the refresh rate of 90 Hz and monitors the downlink signal from the stylus based on the refresh rate of 60 Hz, and the stylus monitors the uplink signal at the refresh rate of 180 Hz and sends the downlink signal based on the refresh rate of 60 Hz. The electronic device sends the uplink signal every 11.1 ms and samples N downlink signals within 16.6 nus after sending the uplink signal. The stylus may send N downlink signals within 16.6 ms after receiving the uplink signal. Although the electronic device may receive the downlink signal from the stylus and keep signal synchronization with the stylus, when the electronic device sends the next uplink signal, the downlink signal of the stylus has not been sent completely, causing overlap between a time to send the uplink signal and a time to sample the downlink signal by the electronic device, resulting in an error in a transmitting and receiving mechanism of the electronic device, and affecting interaction between the electronic device and the stylus.

Figure 19A:
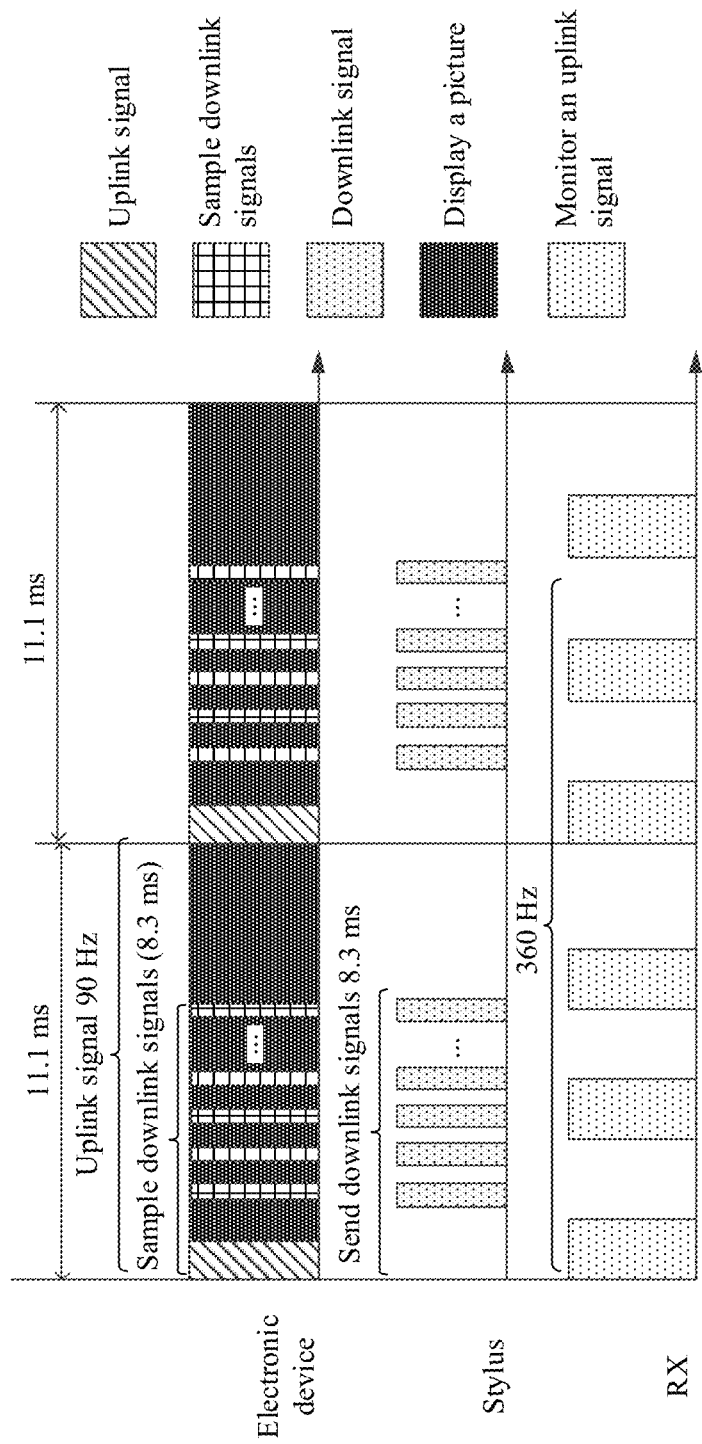
FIG. 19A is another signal timing diagram according to an embodiment of this application.

Referring to FIG. 19A, if the stylus sends the downlink signal based on the maximum refresh rate supported by the electronic device, it is assumed that the maximum refresh rate supported by the electronic device is 120 Hz (the electronic device also supports 60 Hz and 90 Hz). That is, the electronic device sends the uplink signal at the refresh rate of 90 Hz and samples the downlink signal from the stylus based on the refresh rate of 120 Hz, and the stylus monitors the uplink signal at a refresh rate of 360 Hz (the least common multiple of 60 Hz, 90 Hz, and 120 Hz) and sends the downlink signal based on the refresh rate of 120 Hz. The stylus may send N downlink signals within 8.3 ms (1000 ms/120) after receiving the uplink signal. Correspondingly, the electronic device may sample N downlink signals within 8.3 ms after sending the uplink signal, and therefore may keep signal synchronization with the stylus; in addition, interaction with the downlink signal may be completed within 8.3 ms (less than 11.1 ms) without affecting the sending of the uplink signal by the electronic device.

Figure 19B:
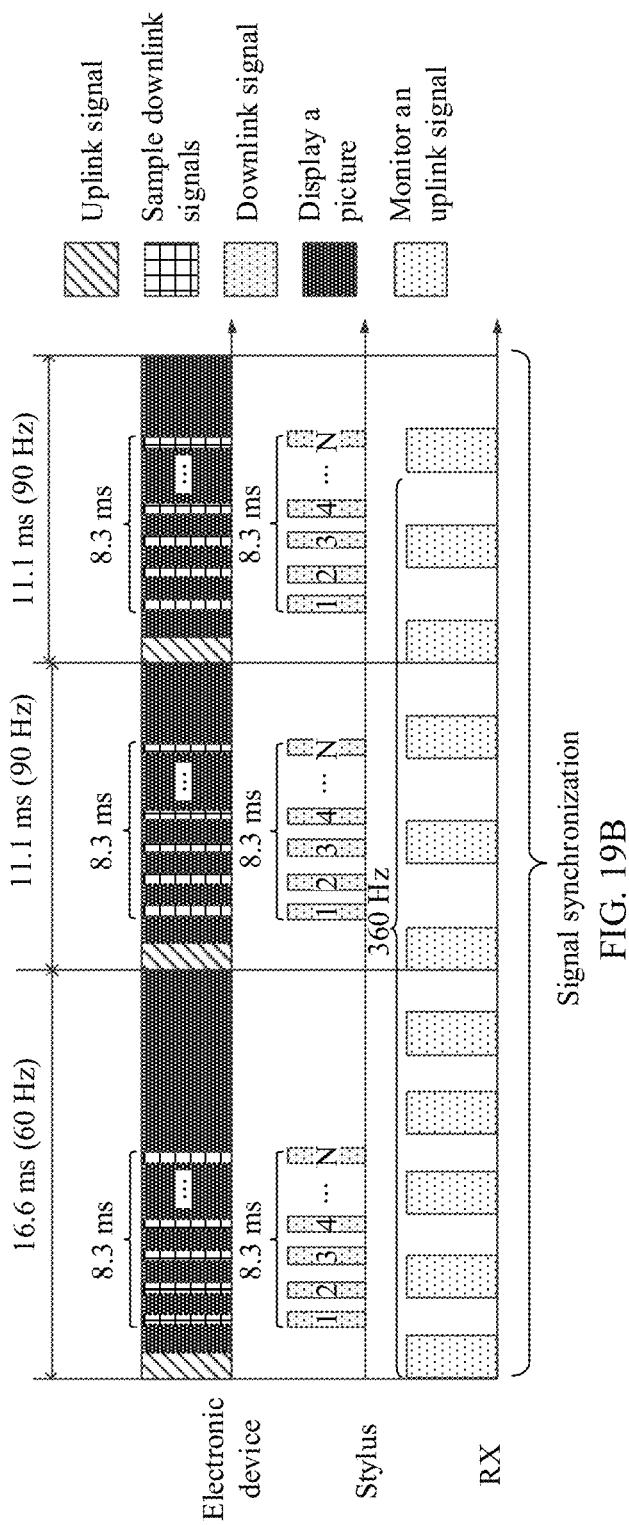
FIG. 19B is another signal timing diagram according to an embodiment of this application.

Referring to FIG. 19B, after the stylus is wirelessly connected to the electronic device, the stylus may send the downlink signal based on the maximum refresh rate of 120 Hz supported by the electronic device, and monitor the uplink signal at 360 Hz; and the electronic device may sample the downlink signal based on the maximum refresh rate of 120 Hz supported by the electronic device, and the refresh rate at which the electronic device sends the uplink signal may be switched from 60 Hz to 90 Hz. In this embodiment of this application, the stylus may monitor the uplink signal at 360 Hz, and may monitor every uplink signal when the refresh rate of the electronic device changes. The stylus sends the downlink signal based on 120 Hz, and therefore, whether the electronic device is 60 Hz or 90 Hz, the stylus may send N downlink signals within 8.3 ms. The electronic device samples the downlink signal based on 120 Hz, and therefore, the stylus may keep signal synchronization with the electronic device. The stylus may send N downlink signals within 8.3 ms from time t0 to time t1, and the electronic device may sample N downlink signals within 8.3 ms, Therefore, the stylus may keep signal synchronization with the electronic device, to achieve the purpose of real-time signal synchronization between the stylus and the electronic device.

In this embodiments of this application, after the stylus is wirelessly connected to the electronic device, the stylus may send the downlink signal based on the maximum refresh rate supported by the electronic device, and the electronic device may sample the downlink signal from the stylus based on the maximum refresh rate supported by the electronic device, so that the purpose of real-time signal synchronization between the electronic device and the stylus can be achieved, and quality of interaction between the electronic device and the stylus can be improved.

In an embodiment, the second refresh rate is greater than the first refresh rate. For example, the first refresh rate is 90 Hz, and the second refresh rate is 120 Hz. When the electronic device sends the uplink signal at the first refresh rate and samples the downlink signal from the stylus based on the second refresh rate, the electronic device may sample a user signal based on the first refresh rate. The user signal may be a signal that a user touches a touch screen of the electronic device. It should be understood that the electronic device may sample M user signals within the period of each uplink signal, where M is an integer greater than 1, and M may be predetermined. In this way, a frequency at which the electronic device samples the downlink signal is inconsistent with a frequency at which the electronic device samples the user signal, and control logic of the electronic device is complicated.

To simplify the control logic of the electronic device, when the electronic device samples the downlink signal from the stylus based on the second refresh rate, the electronic device also samples the user signal based on the second refresh rate, to ensure that the frequency at which the electronic device samples the downlink signal is consistent with the frequency at which the electronic device samples the user signal.

Figure 19C:
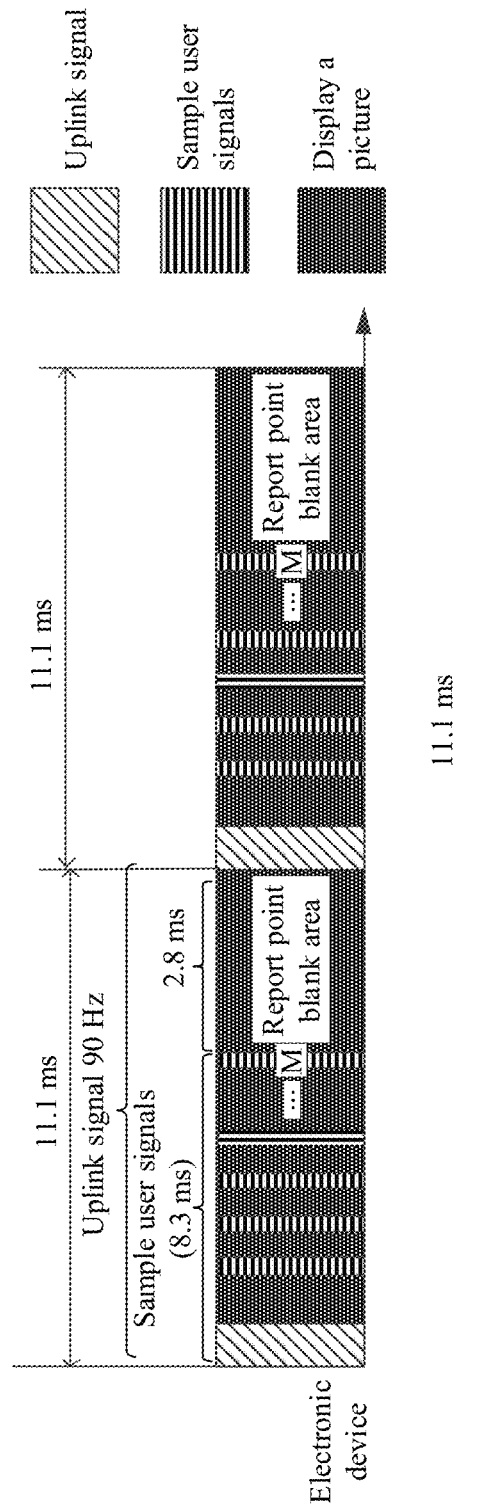
FIG. 19C is another signal timing diagram according to an embodiment of this application.

Referring to FIG. 19C, it is assumed that the first refresh rate is 90 Hz and the second refresh rate is 120 Hz. When the electronic device samples the user signal at 120 Hz, the frequency at which the electronic device samples the user signal is inconsistent, that is, report points (TP term) are not uniform. For example, the electronic device sends the uplink signal at 90 Hz. If the electronic device samples the user signal based on 120 Hz, the electronic device may sample M user signals within 8.3 ms after sending the uplink signal, but does not sample the user signal within subsequent 2.8 ms (11.1 ms-8.3 ms), so that the report points are not uniform and then a signal-to-noise ratio of the report points is low, affecting the quality of the electronic device in detecting the user signal, for example, the user signal cannot be detected within subsequent 2.8 ms. It should be understood that the timing of the electronic device sampling the user signal is not shown in FIG. 16-FIG. 19B above, and the timing of the electronic device sampling the downlink signal is not shown in FIG. 19C-FIG. 20B.

In an embodiment, when the electronic device samples the user signal based on the second refresh rate, the report points may be supplemented in a report point blank area (extend V-porch), to improve the uniformity and signal-to-noise ratio of the report points. It should be understood that the report point blank area may be: within the period of the uplink signal, a duration between the last time the electronic device samples the user signal and the end of the period of the uplink signal, as shown in FIG. 19C. Supplementing the report points in the report point blank area may be understood as: continuing to sample the user signal in the report point blank area. It should be understood that the report point blank area is used for displaying a picture.

For example, a first uplink signal is any uplink signal from the electronic device, and a second uplink signal is the first one following the first uplink signal. That is, after the electronic device sends the first uplink signal to the stylus at the first refresh rate and samples the last user signal based on the second refresh rate, the user signal may be further sampled continuously to supplement the report points in the report point blank area. Referring to FIG. 19C, the first uplink signal is the first one of uplink signals sent by the electronic device in FIG. 19C, and a second uplink signal may be the second one of uplink signals sent by the electronic device in FIG. 19C.

Figure 20A:
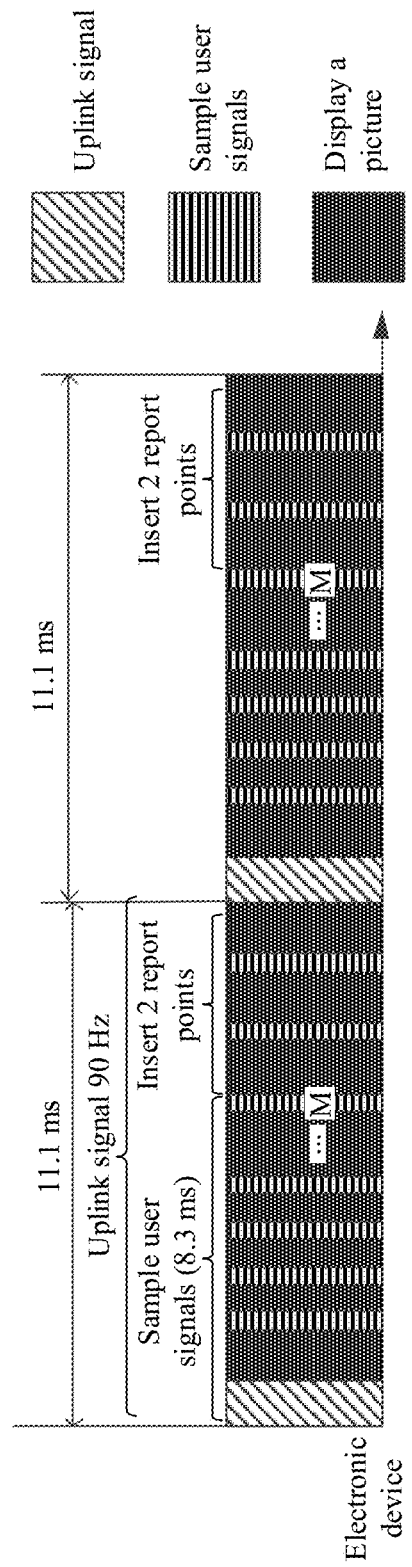
FIG. 20A is another signal timing diagram according to an embodiment of this application.
Figure 20B:
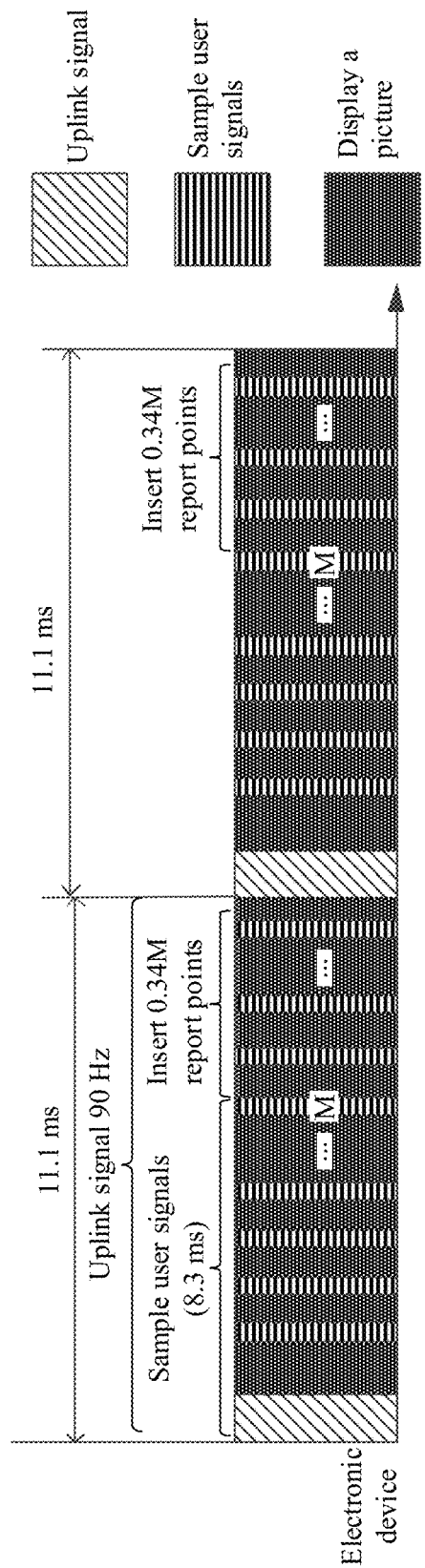
FIG. 20B is another signal timing diagram according to an embodiment of this application.

Referring to FIG. 20A, in an embodiment, the electronic device may supplement a predetermined quantity of report points in the report point blank area, that is, the electronic device may continue to sample a predetermined quantity of user signals after last sampling of the user signal within the period of the uplink signal. FIG. 20A shows an example in which the predetermined quantity is 2. Referring to FIG. 2013, in an embodiment, the electronic device may supplement the report points in the report point blank area based on the second refresh rate. For example, the second refresh rate is 120 Hz, and the electronic device may sample M user signals within 8.3 ms after sending the uplink signal. Then, the electronic device may supplement the report points (that is, insert 0.34M report points in the report point blank area) based on the second refresh rate of 120 Hz after last sampling of the user signal, that is, the electronic device may also sample the user signal every b ms after last sampling of the user signal, and stop sampling the user signal until receiving the next uplink signal. The manner of supplementing the report points in the report point blank area is not limited in this embodiment of this application.

In this embodiment of this application, when the electronic device samples the downlink signal based on the maximum refresh rate supported by the electronic device, the electronic device may sample the user signal based on the maximum refresh rate supported by the electronic device, and the electronic device may supplement the report points in a report point blank area, thereby improving the uniformity and the signal-to-noise ratio of the report points, so as to improve the quality of the electronic device in detecting the user signal.

An embodiment of this application further provides a stylus as shown in FIG. 6. A processor in the stylus may read a program stored in a memory, to perform the actions performed by the stylus in the foregoing signal synchronization system. It should be understood that the memory is not shown in FIG. 6.

An embodiment of this application further provides an electronic device as shown in FIG. 7. A processor in the electronic device may read a program stored in a memory to perform the actions performed by the electronic device in the foregoing signal synchronization system. It should be understood that the memory is not shown in FIG. 7.

An embodiment of this application further provides a signal synchronization system including the stylus as shown in FIG. 6 and the electronic device as shown in FIG. 7. The signal synchronization system can implement the signal synchronization method in the foregoing embodiments.

The term "a plurality of" in this specification refers to two or more than two. The term "and/or" in this specification describes only an association relationship for describing associated objects and represents that three relationships can exist. For example, "A and/or B" can represent the following three cases: Only A exists, both A and B exist, and only B exists. In addition, the symbol "i" in this specification usually indicates an "or" relationship between the associated objects. In the formula, the symbol "/" indicates a "division" relationship between the associated objects.

It may be understood that, in the embodiments of this application, various numeric numbers are distinguished merely for ease of description and are not used to limit the scope of the embodiments of this application.

It may be understood that, in the embodiments of this application, a sequence number of each of the foregoing processes does not mean a sequence of execution. The sequence of execution of the processes should be determined based on functions and internal logic of the processes, and no limitation should be imposed on an implementation process of the embodiments of this application.

What is claimed is:

1. A method, comprising:
   sending, by a stylus, a downlink signal to an electronic device based on a third refresh rate;
   sampling, by the electronic device after being wirelessly connected to the stylus, the downlink signal from the stylus based on the third refresh rate, wherein the third refresh rate is equal to a second refresh rate supported by the electronic device, and wherein the second refresh rate is greater than a first refresh rate supported by the electronic device;
   sending an uplink signal to the stylus at the first refresh rate;
   sampling a user signal based on the second refresh rate, wherein the user signal is a signal that indicates that the user touches a touch screen of the electronic device; and
   sampling the uplink signal from the electronic device at a fourth refresh rate, wherein the fourth refresh rate is a least common multiple of the first refresh rate and the second refresh rate,
   wherein a first uplink signal is any uplink signal from the electronic device, and
   wherein after sampling the user signal based on the second refresh rate, the method further comprises continuing to sample the user signal until the electronic device sends a second uplink signal, wherein the second uplink signal is a first signal following the first uplink signal.

2. The method of claim 1, wherein before sampling the downlink signal from the stylus based on the third refresh rate, the method further comprises sending the first refresh rate and the second refresh rate supported by the electronic device to the stylus.

3. The method of claim 1, further comprising:
   sending the downlink signal to the electronic device based on the second refresh rate in response to the electronic device switching from the first refresh rate to the second refresh rate; and
   sampling the uplink signal from the electronic device at the fourth refresh rate,
   wherein the electronic device switching from the first refresh rate to the second refresh rate comprises the electronic device sending the uplink signal to the stylus at the second refresh rate, and sampling the downlink signal from the stylus based on the second refresh rate.

4. The method of claim 3, wherein the electronic device is switched from the first refresh rate to the second refresh rate if a period of the uplink signal from the electronic device changes.

5. The method of claim 1, wherein a quantity of times the electronic device continues to sample the user signal is a preset quantity.

6. The method of claim 1, wherein continuing to sample the user signal comprises continuing to sample the user signal based on the second refresh rate.

7. The method of claim 1, wherein the first refresh rate is 60 Hz, and the second refresh rate is 90 Hz.

8. A method, comprising:
   sending, by a stylus, a downlink signal to an electronic device based on a third refresh rate after being wirelessly connected to the electronic device, wherein the electronic device supports a first refresh rate and a second refresh rate, wherein the second refresh rate is greater than the first refresh rate, and wherein the third refresh rate is equal to the second refresh rate;
   receiving an uplink signal from the electronic device at the first refresh rate, wherein a user signal of the electronic device is sampled based on the second refresh rate, and wherein the user signal is a signal that indicates that the user touches a touch screen of the electronic device; and
   sampling the uplink signal from the electronic device at a fourth refresh rate, wherein the fourth refresh rate is a least common multiple of the first refresh rate and the second refresh rate,
   wherein a first uplink signal is any uplink signal from the electronic device, and
   wherein the user signal continues to be sampled until the electronic device sends a second uplink signal, wherein the second uplink signal is a first signal following the first uplink signal.

9. The method of claim 8, wherein before sending the downlink signal to the electronic device based on the third refresh rate, the method further comprises receiving the first refresh rate and the second refresh rate from the electronic device.

10. The method of claim 8, further comprising:
    sending the downlink signal to the electronic device based on the second refresh rate when the electronic device is switched from the first refresh rate to the second refresh rate; and
    sampling the uplink signal from the electronic device at the fourth refresh rate,
    wherein the electronic device switches from the first refresh rate to the second refresh rate when the electronic device sends the uplink signal to the stylus at the second refresh rate and samples the downlink signal from the stylus based on the second refresh rate.

11. The method of claim 10, wherein the electronic device is switched from the first refresh rate to the second refresh rate if a period of the uplink signal from the electronic device changes.

12. The method of claim 8, wherein a quantity of times the user signal continues to be sampled is a preset quantity.

13. The method of claim 8, wherein the user signal continues to be sampled based on the second refresh rate.

14. A method, comprising:
    sampling a downlink signal from a stylus based on a third refresh rate after being wirelessly connected to the stylus, wherein the third refresh rate is equal to a second refresh rate supported by an electronic device, and wherein the second refresh rate is greater than a first refresh rate supported by the electronic device;
    sending an uplink signal to the stylus at the first refresh rate, wherein the uplink signal is sampled at a fourth refresh rate that is a least common multiple of the first refresh rate and the second refresh rate; and sampling a user signal based on the second refresh rate, wherein the user signal is a signal that indicates that the user touches a touch screen of the electronic device, wherein a first uplink signal is any uplink signal from the electronic device, and wherein after sampling the user signal based on the second refresh rate, the method further comprises continuing to sample the user signal until the electronic device sends a second uplink signal, wherein the second uplink signal is a first signal following the first uplink signal.

15. The method of claim 14, wherein before sampling the downlink signal from the stylus based on the third refresh rate, the method further comprises sending the first refresh rate and the second refresh rate to the stylus.

16. The method of claim 14, wherein the electronic device is switched from the first refresh rate to the second refresh rate if a period of the uplink signal from the electronic device changes.

17. The method of claim 14, wherein a quantity of times the electronic device continues to sample the user signal is a preset quantity.

18. The method of claim 14, wherein continuing to sample the user signal comprises continuing to sample the user signal based on the second refresh rate.

19. The method of claim 14, wherein the first refresh rate is 60 Hz, and the second refresh rate is 90 Hz.

\* \* \* \* \*